(12) United States Patent
Sui et al.

(10) Patent No.: US 6,359,861 B1
(45) Date of Patent: Mar. 19, 2002

(54) METHOD FOR SCHEDULING TRANSMISSIONS IN A BUFFERED SWITCH

(75) Inventors: Kai-Yeung S. Sui, Charlestown; Anthony C. Kam, Cambridge, both of MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 09/131,951

(22) Filed: Aug. 10, 1998

Related U.S. Application Data
(60) Provisional application No. 60/061,347, filed on Oct. 8, 1997.

(51) Int. Cl.$^7$ .......................... H04L 12/56; G01R 31/08
(52) U.S. Cl. ..................... 370/230; 370/397; 370/413
(58) Field of Search .................. 370/229, 230, 370/231, 235, 252, 395, 398, 399, 412–415, 416, 428, 429, 468, 397; 340/825.79

(56) References Cited

U.S. PATENT DOCUMENTS

| | | | |
|---|---|---|---|
| 5,267,235 A | | 11/1993 | Thacker .................. 370/60 |
| 5,500,858 A | | 3/1996 | McKeown ................ 370/60 |
| 5,517,495 A | * | 5/1996 | Lund et al. ............... 370/60 |
| 5,689,499 A | | 11/1997 | Hullett et al. ............ 370/235 |
| 5,689,506 A | * | 11/1997 | Chiussi et al. ........... 370/388 |
| 5,748,629 A | | 5/1998 | Caldera et al. .......... 370/389 |
| 5,982,771 A | * | 11/1999 | Caldara et al. .......... 370/389 |
| 6,018,527 A | * | 1/2000 | Yin et al. ................. 370/412 |
| 6,047,000 A | * | 4/2000 | Tsang et al. ............ 370/412 |
| 6,014,367 A | * | 11/2000 | Joffe ....................... 370/230 |
| 6,157,654 A | * | 12/2000 | Davis ...................... 370/412 |

* cited by examiner

Primary Examiner—Alpus H. Hsu
Assistant Examiner—Duc Ho
(74) Attorney, Agent, or Firm—Hamilton, Brook, Smith & Reynolds, P.C.

(57) ABSTRACT

A method for scheduling transmission of cells through a data switch having a plurality of inputs and outputs provides a plurality of buffers at each input. Each buffer corresponds to an output, or to a virtual circuit. A weight is assigned to each buffer; and buffers are selected according to a maximal weighted matching. Finally, cells are transmitted from the selected buffers to the corresponding outputs. Weights are based on number of credits associated with each buffer. Optionally, the weight is zero if the associated buffer is empty. A credit bucket size may be assigned to each buffer to limit the number of credits when the buffer is empty. Alternatively, weights are set to either buffer length, or to the number of credits, whichever is less. Or, weights may be set to validated waiting times associated with the oldest cells. Each input/output pair is assigned the maximum weight of any associated virtual connection. Fairness is provided in leftover bandwidth by determining a second matching between remaining inputs and outputs. Buffers are selected according to the second matching. In addition, a linked list structure is provided. Each list is associated with a weight, and holds references to buffers which have that weight, and has links to next and previous lists associated respectively with weights one greater and one less than the subject list's associated weight. Each reference is placed in a list associated with the respective weight. Upon changing a buffer's weight, its reference is moved to the list corresponding to the new weight. Previously unselected buffers are selected from the lists in order descending weights.

58 Claims, 13 Drawing Sheets

METHOD FOR SCHEDULING TRANSMISSIONS IN A BUFFERED SWITCH

RELATED APPLICATION

This application claims the benefit of U.S. Provisional Application No. 60/061,347, filed Oct. 8, 1997, the entire teachings of which are incorporated herein by reference.

BACKGROUND OF THE INVENTION

Switches and routers have traditionally employed output-queuing. When packets or cells arrive at an input port, they are immediately transferred by a high-speed switching fabric to the correct output port and stored in output queues. Various queue management policies which have been considered, such as virtual clock algorithms, deficit round robin, weighted fair queuing or generalized processor sharing, and many variations, have attempted to control precisely the time of departure of packets belonging to different virtual circuits (VCs) or flows or sessions, thus providing various quality-of-service (QoS) features such as delay, bandwidth and fairness guarantees.

However, for these pure output-queuing schemes to work, the speed of the switching fabric and output buffer memory must be N times faster than the input line speed where N is the number of input lines, or the sum of the line speeds if they are not equal. This is because all input lines could have incoming data arriving at the same time, all needing to be transferred to the same output port. As line speeds increase to the Gb/s range and as routers have more input ports, the required fabric speed becomes infeasible unless very expensive technologies are used.

To overcome this problem, switches with input-queuing have been used in which incoming data are first stored in queues at the input ports. The decision of which packets to transfer across the fabric is made by a scheduling algorithm. A relatively slower fabric transfers some of the packets or cells to the output ports, where they might be transmitted immediately, or queued again for further resource management. The present invention only considers the problem from the viewpoint of designing a fabric fast enough to manage input queues, regardless of whether there are also output queues.

The ratio of the fabric speed to the input speed is called the "speedup." An output-queued switch essentially has a speedup of N (whereupon input queues become unnecessary), whereas an input-queued switch typically has a much lower speedup, as low as the minimum value of one, i.e., no speedup. The main advantage of input queuing with low speedup is that the slower fabric speed makes such a switch more feasible and scalable, in terms of current technology and cost. The main disadvantage is that packets are temporarily delayed in the input queues, especially by other packets in the same queues destined for different outputs. In contrast, with output-queuing a packet is never affected by other packets destined for different outputs. This additional input-side queuing delay must be understood or quantified in order for an input-queued switch to provide comparable QoS guarantees as an output-queued switch.

One problem with input-queued switches is that if the next cell to be transmitted—that is, the cell at the head of the queue—is blocked because its destination port is busy, or perhaps because it has a low priority, all other cells queued up behind it are also blocked. This is known as head-of-line blocking. This problem is commonly resolved by allowing per-output queuing, in which each input has not one but M queues corresponding to M outputs. Thus the unavailability of one output does not affect the scheduling of cells bound for other outputs.

Graph theory concepts have been used to develop algorithms in attempts to efficiently select input/output pairs for transmission across the switch fabric. Inputs are treated as one set of nodes, outputs as the second set of nodes, and the paths between input/output pairs having data to transmit, are treated as the edges of the graph. A subset of edges such that each node is associated with only one edge is called a matching.

L. Tassiulas, A. Ephremides, "Stability properties of constrained queuing systems and scheduling policies for maximum throughput in multihop radio networks," *IEEE Trans. Automatic Control*, vol.37, no.12, December 1992, pp.1936–1948, presented a scheduling algorithm using queue lengths as edge weights and choosing a matching with the maximum total weight at each timeslot. The expected queue lengths are bounded, i.e., they do not exceed some bound, assuming of course that no input or output port is overbooked. That is, this is true even if the traffic pattern is non-uniform, and even if any or all ports are loaded arbitrarily close to 100%. Hence, this "maximum weighted matching" algorithm, using queue lengths as weights, achieves 100% throughput. For an overview of the maximum weighted matching problem, see e.g., Ahuja, et al, *Network flows: theory, algorithms, and applications*. Published: Englewood Cliffs, N.J., Prentice Hall, 1993.

No speedup is required for this result. However, a main drawback preventing the practical application of this theoretical result is that maximum weighted matching algorithms are complex and slow, and are therefore not suitable for implementation in high-speed switches. Most algorithms have $O(N^3)$ or comparable complexity, and large overhead.

To overcome this problem, faster algorithms have recently been proved to achieve the same result of bounding expected queue lengths, and though not necessarily prior art, are presented here for a description of the present state of the art. For example, Mekkittikul and McKeown, "A Practical Scheduling Algorithm to Achieve 100% Throughput in Input-Queued Switches," *IEEE INFOCOM* 98, San Francisco, April 1998, uses maximum weighted matchings. However the weights are "port occupancies" defined by $w(e_{ij})$=sum of queue lengths of all VCs at input port i and all VCs destined to output port j. By using these edge weights, a faster, on the order of $N^{2.5}$ ($O(N^{2.5})$), complexity algorithm can be used to find maximum weighted matchings.

L. Tassiulas, "Linear complexity algorithms for maximum throughput in radio networks and input queued switches," *IEEE INFOCOM* 98, San Francisco, April 1998 goes one step further and shows that, with the original queue lengths as edge weights, expected queue lengths are bounded by a large class of randomized algorithms. Moreover, some of these algorithms have $O(N^2)$ complexity or "linear complexity", i.e., linear in the number of edges.

Mekkittikul and McKeown, "A Starvation-free Algorithm for Achieving 100% Throughput in an Input-Queued Switch," ICCCN 1996 also uses a maximum weighted matching algorithm on edge weights which are waiting times of the oldest cell in each queue. As a result, the expected waiting times, or cell delays, are bounded. This implies queue lengths are bounded, and hence is a stronger result.

All of these results are based on Lyapunov stability analysis, and consequently, all of the theoretically established bounds are very loose. While the algorithm of Tassiulas and Ephremides, and McKeown, Anantharam and Walrand, "Achieving 100% Throughput in an Input-Queued Switch." Proc. *IEEE INFOCOM*, San Francisco, March 1996, exhibits relatively small bounds in simulations, the sample randomized algorithm given in L. Tassiulas, "Linear complexity algorithms for maximum throughput in radio networks and input queued switches," *IEEE INFOCOM 98*, San Francisco, April 1998, which is the only "linear-complexity" algorithm above, still exhibits very large bounds in simulations. To the best of our knowledge, no linear-complexity algorithm has been shown to have small bounds in simulations and also provide some kind of theoretical guarantee.

Several new works have appeared recently dealing with QoS guarantees with speedup. The earliest of these, Prabhakar and McKeown, "On the speedup required for combined input and output queued switching," Computer Science Lab Technical Report, Stanford University, 1997, provides an algorithm that, with a speedup of four or more, allows an input-queued switch to exactly emulate an output-queued switch with FIFO queues. In other words, given any cell arrival pattern, the output patterns in the two switches are identical. Stoica, Zhang, "Exact Emulation of an Output Queuing Switch by a Combined Input Output Queuing Switch," IWQoS 1998, and Chuang, Goel, McKeown, Prabhakar, "Matching Output Queuing with a Combined Input Output Queued Switch," Technical Report CSL-TR-98-758, Stanford University, April 1998 strengthen this result in two ways. First, their algorithms require only a speedup of two. Second, their algorithms allow emulation of other output-queuing disciplines besides FIFO. These results can therefore be used with many of the common output fair queuing schemes that have known QoS guarantees.

Charny, Krishna, Patel, Simcoe, "Algorithms for Providing Bandwidth and Delay Guarantees in Input-Buffered Crossbars with Speedup," IWQoS 1998, and Krishna, Patel, Charny, Simcoe, "On the Speedup Required for Work-Conserving Crossbar Switches," IWQoS 1998, presented several new algorithms that are not emulation-based but provide QoS guarantees that are comparable to those achievable in well-known output-queuing schemes. For example, delay bounds independent of the switch size are obtained with a speedup of six. Delay bounds dependent on the switch size are obtained with a speedup of four. Finally, 100% throughput can be guaranteed with a speedup of two.

SUMMARY OF THE INVENTION

While theoretical studies have concentrated on the goals of bounding expected queue lengths and waiting times, various simulation studies have been carried out to investigate other aspects as well, such as average delay, packet loss or blocking probabilities, etc. Some of these studies also investigated the advantage of having a small speedup of about two to five (much smaller than N). The scheduling algorithms used may be based on matching algorithms such as those of the theoretical works cited above, e.g., maximum weighted matching, maximum size (unweighted) matching randomized matchings, etc.

The present invention focuses on three QoS features: bandwidth reservations, cell delay guarantees, and fair sharing of unreserved switch capacity in an input-queued switch with no speedup. Several embodiments employing fast, practical, linear-complexity scheduling algorithms are presented which, in simulations, support large amounts of bandwidth reservation (up to 90% of switch capacity) with low delay, facilitate approximate max-min fair sharing of unreserved capacity, and achieve 100% throughput.

In accordance with the present invention, a method for scheduling transmission of cells through a data switch, preferably a crossbar switch, having a plurality of inputs and outputs, provides a plurality of buffers at each input, each buffer corresponding to an output. The buffers temporarily hold incoming cells. A weight is assigned to each buffer; and buffers are selected according to a weighted matching of inputs and outputs. Finally, cells are transmitted from the selected buffers to the corresponding outputs.

Preferably, the matching requires that each buffer which is not selected must share an input or output with a selected buffer whose weight is greater or equal to the unselected buffer's weight.

Preferably, the matching is a maximal weighted matching and is determined by using a stable marriage algorithm. Buffers having the greatest weight are selected first, followed by buffers having the next greatest weight, and so on, until buffers having a least positive weight are assigned.

In a preferred embodiment, assigning weights, selecting buffers and transmitting cells are performed repeatedly over consecutive timeslots. Within each timeslot, credits are assigned to each buffer according to a guaranteed bandwidth for that buffer. The weights associated with each buffer are set based on an accumulated number of credits associated with the buffer. Preferably, credits are assigned in integral units, including zero units.

In another preferred embodiment, the weight associated with a buffer is zero if the buffer is empty, regardless of actual credit.

In yet another preferred embodiment, a credit bucket size is assigned to each buffer. If a buffer is empty and has a number of credits exceeding its associated credit bucket size, the buffer receives no further credits.

In still another preferred embodiment, each weight associated with a buffer is set to either the buffer's length, or to the number of credits associated with the buffer, preferably whichever is less. In an enhancement to this embodiment, the age of each cell is maintained, and if the age for some cell exceeds a predefined threshold for the corresponding buffer, an exception mechanism is employed to decide whether to select the buffer. In another enhancement, cells are flushed out of the buffer with phantom cells during long idle periods.

In yet another preferred embodiment, each buffer's weight is set to a validated waiting time associated with an oldest cell in the buffer. Validated waiting time for a cell is determined by validating a cell when there is a credit available, and recording the time of validation for each cell. The validated waiting time for that cell is then calculated based on the difference between the current time and the validation time.

Alternatively, the validated waiting time of the oldest cell in a buffer is determined to be either the actual waiting time of the oldest cell, or the age of the oldest credit associated with the buffer, whichever is less.

In yet another alternative, the validated waiting time of the oldest cell is estimated. The estimate is based on the actual waiting time of the oldest cell, the number of credits associated with the buffer, and the rate at which credits are accrued.

In still another preferred embodiment, each buffer's weight is scaled by a constant which is inversely proportional to a predetermined tolerable delay. Prefereably, the tolerable delay associated with a buffer is the inverse of the guaranteed bandwidth associated with the buffer.

In yet another preferred embodiment, a weighted matching is computed at each timeslot and a corresponding total edge weight for the matching determined. The total edge weight of the determined current matching is compared with the selected matching from the previous timeslot. The matching having the largest total edge weight is selected.

In still another preferred embodiment, fairness is provided in any leftover bandwidth by determining a second matching between remaining inputs and outputs. Buffers are selected according to the second matching, and cells are transmitted from the selected buffers to the corresponding outputs. Preferably, max-min fairness is used to determine the second matching. Alternatively, during a second phase of weight assignments, additional paths are chosen based on usage weights. In yet another alternative, fairness is implemented by assigning weights based on both usage and credits.

In yet another preferred embodiment, several virtual connections share the same input-output pair. Each virtual connection has its own guaranteed rate. At each input, a buffer is provided for each virtual connection passing through that input. For each input/output pair, the virtual connection with the maximum weight is determined, and that weight is assigned to the corresponding input/output pair. Input/output pairs are then selected based on the assigned weights, and according to a maximal weighted matching. Finally, cells are transmitted from the selected inputs to the corresponding outputs.

In still another preferred embodiment, a data structure of linked lists is provided. Each list is associated with a weight, and holds references to buffers which have that weight. In addition, each list has links to next and previous lists associated respectively with weights one greater and one less than the subject list's associated weight. Each buffer reference is placed in a list associated with the weight of the buffer. Upon incrementing a buffer's weight by one, its reference is moved from its current list to the next list. Similarly, upon decrementing a buffer's weight by one, its reference is moved from its current list to the previous list. Finally, for each list in order of descending weights, buffers are selected which do not share input or output nodes with buffers which have already been selected.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
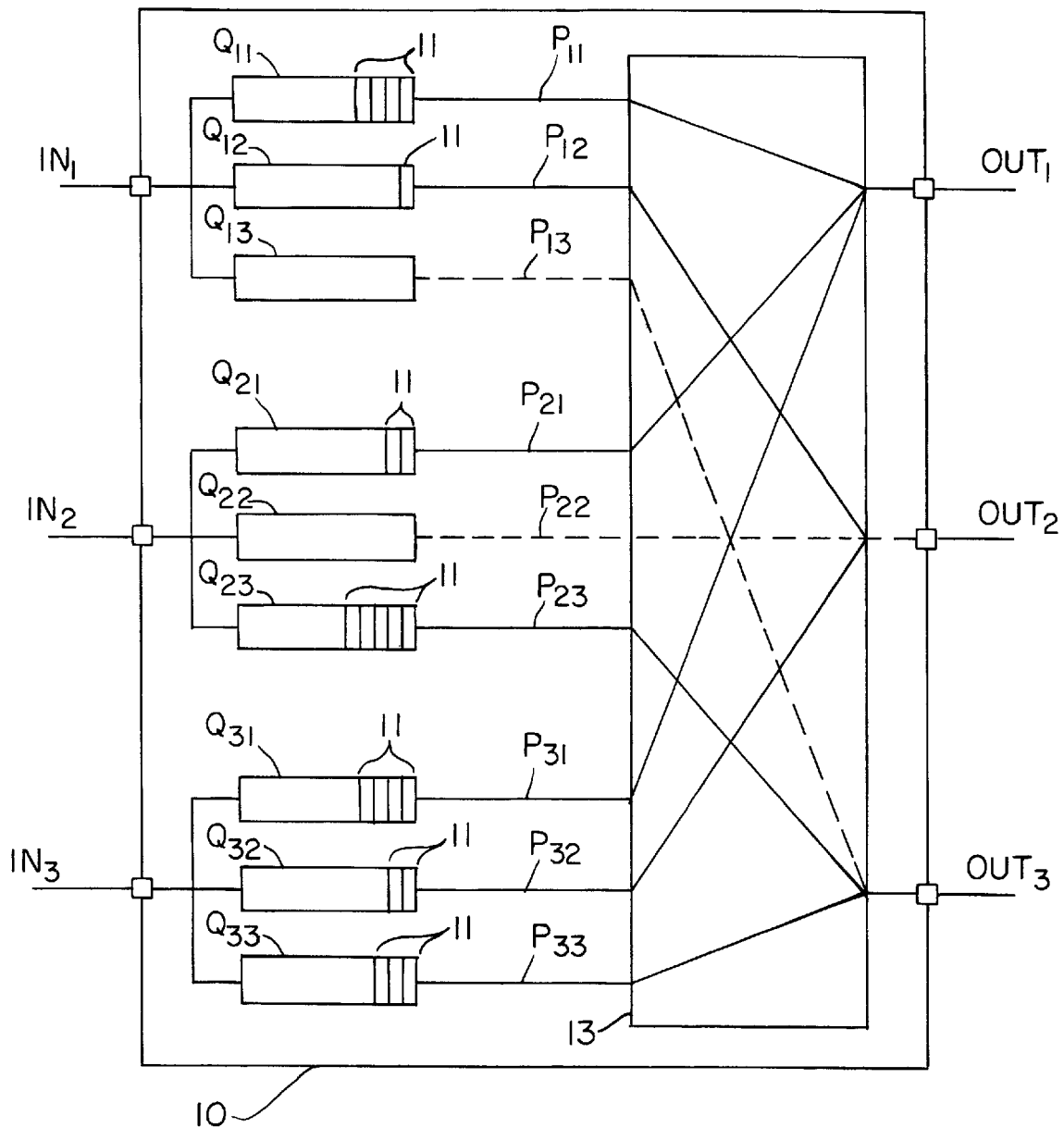
FIG. 1 is a schematic drawing illustrating a 3×3 crossbar switch with per-output input queuing.

FIG. 1 schematically illustrates a typical 3×3 crossbar switch 10 with per-output input queuing. Each packet or cell arriving at any of the inputs $IN_1$–$IN_3$ is routed to the proper queue $Q_{ij}$ according to its destination. Here, queues such as $Q_{11}$ and $Q_{12}$ are shown holding cells 11 while other queues such as $Q_{13}$ and $Q_{22}$ are empty. Paths $P_{ij}$ with solid lines are shown connecting queues with cells 11 to the switch fabric 13, indicating possible transmission paths. Paths $P_{13}$ and $P_{22}$ are shown in dashed lines because the corresponding queues $Q_{12}$ and $Q_{22}$ are empty, indicating that there are presently no cells to transmit. During each timeslot, the switch fabric 13 transfers packets or cells from selected queues to the destination outputs $OUT_1$–$OUT_3$.

It is assumed that packets are transferred across the switch fabric 13 in fixed sized cells. Even if incoming packets have different sizes, however, they can be broken down into smaller, fixed-size cells for easier handling and re-assembled later. Therefore, packets and cells are used interchangeably hereinafter.

The switch fabric 13 may be a crossbar switch or any functional equivalent, and has the constraint that during any given timeslot, any input port can transmit to one output port (or none at all), and any output port can only receive from one input port (or none at all).

In addition, it is assumed that the switch has the minimum speedup of one, i.e., the fabric speed is equal to the input speed. The motivation is that lower speedup makes the switch more feasible and scalable in terms of current technology and costs. A speedup of one also provides the most stringent testing condition for the present invention's algorithms in simulations.

Under the above assumptions, a scheduling algorithm must choose a set of cells to transfer at each timeslot, with the main goals of supporting bandwidth reservations and cell delay guarantees. The choice is based on various parameters associated with each VC's queue.

Figure 2:
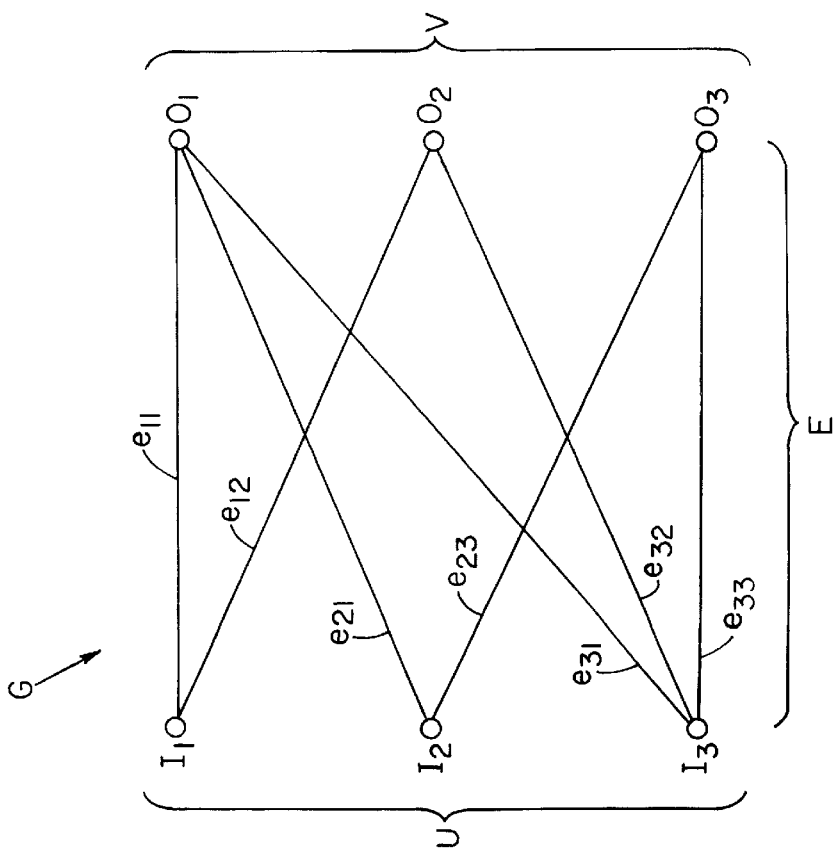
FIG. 2 is an illustration of a bipartite graph representing the 3×3 switch of FIG. 1.

FIG. 2 illustrates a bipartite graph $G=(U,V,E)$ which abstractly represents the crossbar switch of FIG. 1. The input ports $IN_1$–$IN_3$ of FIG. 1 are represented in the graph of FIG. 2 as a set of nodes $U=\{I_1, I_2, I_3\}$ respectively, and the output ports $OUT_1$–$OUT_3$ are represented as another set of nodes $V = \{O_1, O_2, O_3\}$. The edges E represent possible transmissions i.e., the paths $P_{ij}$ of FIG. 1 over which cells could be transmitted from a particular input port $IN_i$ to a particular output port $OUT_j$. The set E of edges is determined once for each timeslot. If a particular queue is empty, there is no edge in the graph for that timeslot.

For example, input queue $Q_{11}$ (FIG. 1) holds some cells 11 destined for $OUT_1$, therefore an edge $e_{11}$ is drawn in the graph of FIG. 2, representing a possible transmission along path $P_{11}$. Thus edge $e_{11}$ corresponds to path $P_{11}$ of FIG. 1, and so on. Transmissions through the switch fabric 13 can occur at the same time if and only if the selection of paths, or edges, corresponds to a "matching", i.e., a subset of edges $M \subset E$ such that each node has at most one connecting edge in M.

Most scheduling algorithms, including those of the present invention, associate a priority or weight $w_{ij} = w(e_{ij})$ with each edge $e_{ij} \in E$. Thus most scheduling algorithms are characterized by two separate choices: deciding how to assign edge weights $w(e_{ij})$, and computing a matching given the weighted graph (G,w). The present invention's contributions derive from judicious choices of edge weights.

Figure 3:
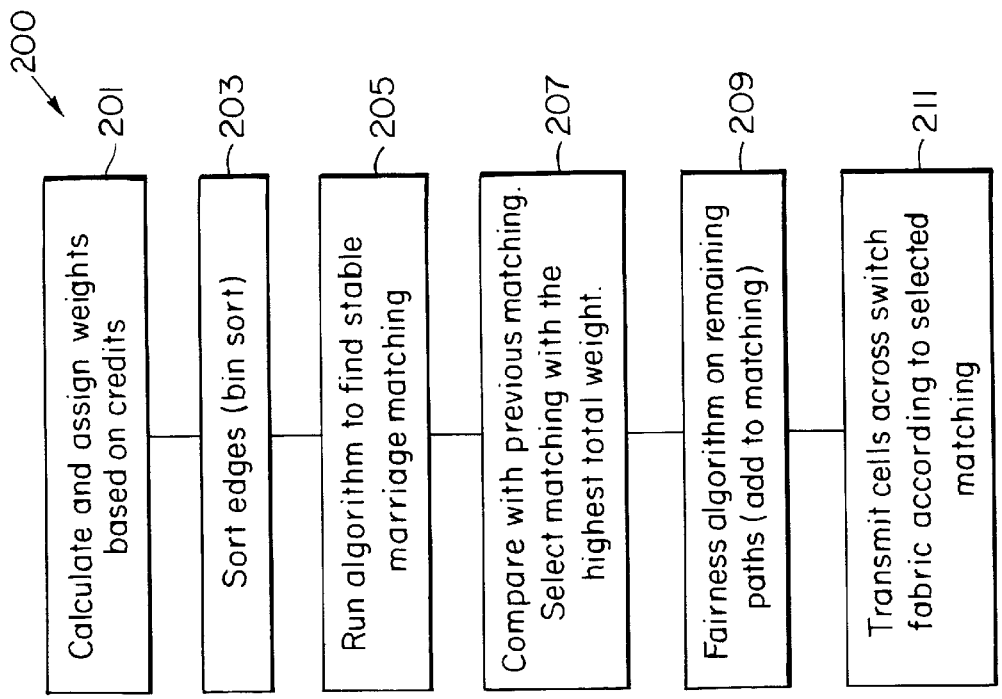
FIG. 3 is a flow chart illustrating the basic steps of the present invention.

FIG. 3 is a flowchart illustrating the basic steps of a preferred embodiment of the present invention. First, in step 201, the weights $w_{ij}$ are calculated for each edge $e_{ij}$. All of the weighting algorithms of the present invention are based at least in part on "credits", discussed further below.

After assigning, weights, the edges are sorted by weight (step 203). Then, a "central queue" algorithm is used to find a stable marriage matching (step 205). The resulting matching may be compared, in step 207, with the matching from the previous timeslot, and the matching with the highest total weight selected.

If transmission paths (or edges) are still available across the switch after a matching has been selected, a fairness algorithm may be applied, in step 209, to select from among the remaining edges. The selections are added to the matching, and finally, in step 211, cells are transmitted across the switch fabric according to the selected matching.

Note that in at least one preferred embodiment, step 209, the fairness algorithm, is merged with step 201, the calculation of edge weights, such that steps 203, 205, 207 provide both bandwidth guarantees and fairness for leftover bandwidth.

The present invention envisions a scheme where, at start-up time, each VC (or flow, or session) negotiates during an admission control process for a guaranteed transmission rate. The network grants, denies or modifies the requests based on external factors such as priority, billing, etc., in addition to current congestion level. How admission control makes this decision is not considered. It is simply assumed that the network will not overbook any resource. Once agreed, a VC's guaranteed rate typically does not change, although this is not required by the present invention.

Two extreme cases clarify what it means to have bandwidth "reserved" for a VC. First, if the VC sends a smooth stream of cells below its guaranteed rate, then the cells should be transmitted with very little delay. Alternatively, if the VC is extremely busy and constantly has a large backlog of cells queued up, then its average transmission rate should be at least its guarantee rate.

It is less clear what should happen when the VC is very bursty and sometimes transmits at a very high peak rate and sometimes becomes idle, even though its average rate is comparable to its guaranteed rate. Typical traffic is indeed bursty and some burstiness must be tolerated, but it is very difficult to design an algorithm to tolerate arbitrary amounts of burstiness. Thus, a compromise must be sought. We propose to clarify this issue by providing a "contract" with each algorithm. Each VC (or user) can understand exactly what service to expect from each algorithm.

Figure 4A:
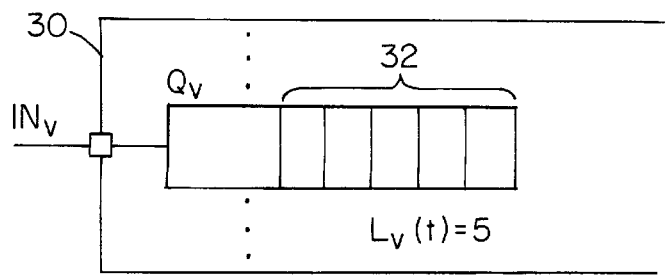
FIGS. 4A–4G are block diagrams illustrating various terms.

Various parameters associated with a typical VC v are defined with the help of FIGS. 4A–4G. Cells of a VC v are received at input $IN_v$ and stored in the corresponding buffer $Q_v$ of the switch 30. $L_v(t)$ denotes the queue length, i.e., the number of input-queued cells 32 of v at the beginning of timeslot t. In FIG. 4A, there are five cells in buffer $Q_v$, so $L_v(t)=5$.

Figure 4B:
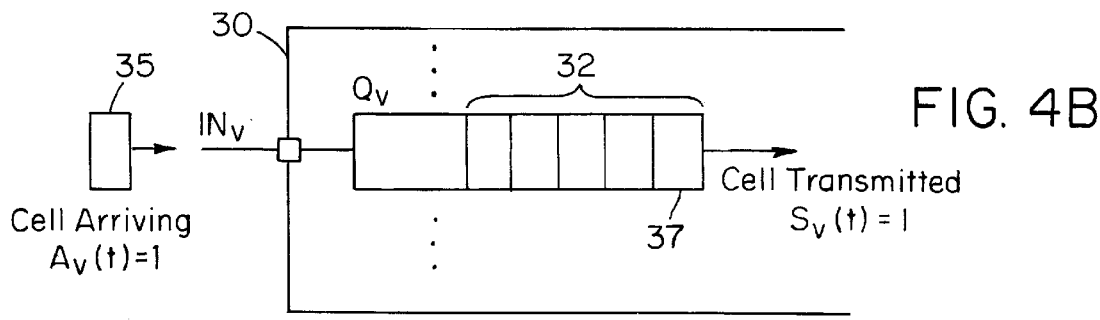

As shown in FIG. 4B, $A_v(t)$ denotes the number of cells belonging to v that arrive during timeslot t. Here, a cell 35 is arriving during timeslot t, so that $A_v(t)=1$. $S_v(t)$ denotes the number of cells belonging to v that are transmitted across the switch fabric during timeslot t. Note that $S_v(t)$ can only be 0 or 1. Here, a queued cell 37 is transmitted across the switch, so that $S_v(t)=1$.

Figure 4C:
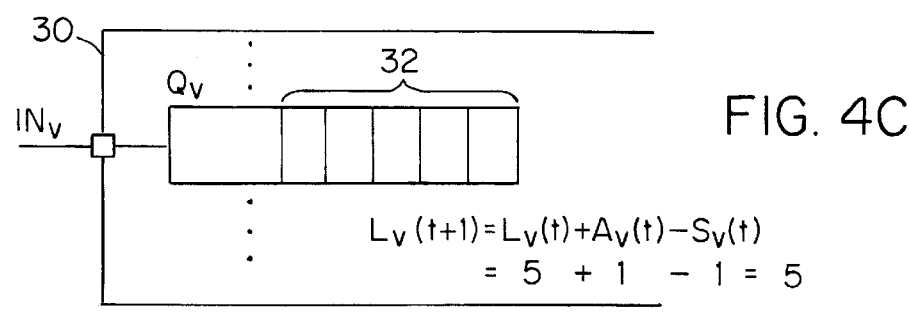
Figure 4D:
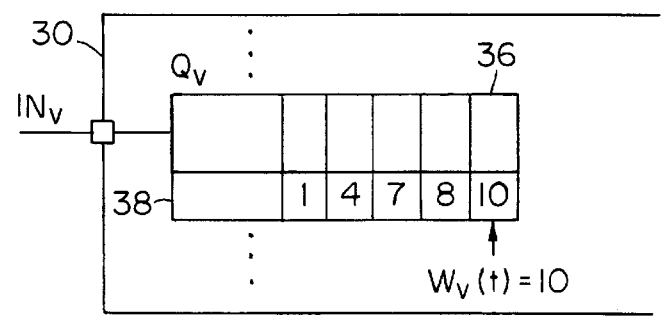
Figure 4E:
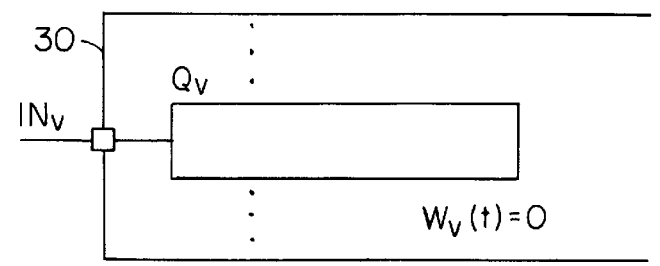

Thus, as can be seen from FIG. 4C, at the beginning of the next timeslot t+1, $$L_v(t+1) = L_v(t) + A_v(t) - S_v(t). \quad (1)$$

$W_v(t)$ denotes the waiting time or delay of the oldest input-queued cell of v, measured in units of timeslots. In a preferred embodiment, a cell arriving in the current timeslot has a minimum waiting time of one, a cell that arrived in the previous timeslot has a waiting time of two, etc. This is demonstrated in FIG. 4D. Waiting times 38 are maintained for each cell in the queue. The waiting time for queue $W_v(t)$ is then the waiting time of the oldest cell 36, so in this case $W_v(t)=10$ timeslots. Of course, time stamps may be maintained rather than waiting times, which may then be derived from the time stamps and the current time.

VCs with an empty queue have waiting times defined to be zero. For example, in FIG. 4E, buffer $Q_v$ is empty. Thus, its delay or waiting time is zero, i.e., $W_v(t)=0$.

Each VC v has a guaranteed bandwidth (GBW) denoted as $g_v$, measured in units of cells/timeslot. Outstanding credit, or simply credit, $C_v(t)$, of a VC v at the beginning of a timeslot t is then defined by the following equation:

$$C_v(t+1) = C_v(t) + g_v - S_v(t). \quad (2)$$

A VC thus gains fractional credits at a steady rate equal to its guaranteed rate $g_v$, and spends one credit whenever it transmits a cell. An equivalent view is that $$C_v(t) = t \times g_v - \sum_{\tau=1}^{t} S_v(\tau),$$

i.e., the guaranteed number of transmissions up to time t for VC v, less the actual number of transmissions up to time t.

Figure 4F:
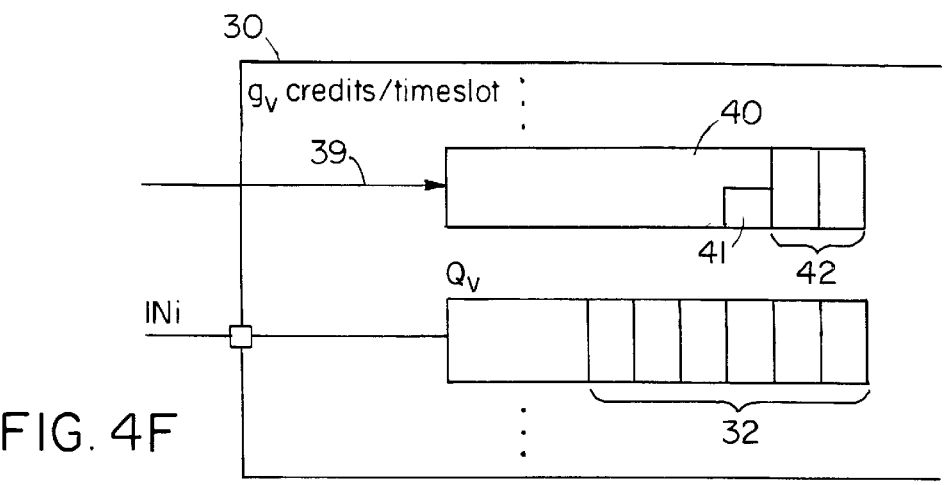

This concept of credits is demonstrated in FIG. 4F. Credits are maintained, conceptually at least, in a credit buffer 40. In practice, of course, the number of credits may be simply maintained in a register. For a given $VC_v$, the number of credits $C_v$ grows at the continuous rate of $g_v$ credits per timeslot, as indicated by arrow 39. In this example, at time t there are two full credits 42 and a fractional credit 41.

Though not necessary, a preferred embodiment uses the integral part $\lfloor C_v(t) \rfloor$ as an approximation to the real number $C_v(t)$. The difference is negligible and from here on $C_v(t)$ is used even when $\lfloor C_v(t) \rfloor$ is meant. Now, if $\tau_v \triangleq 1/g_v$ denotes the number of timeslots it takes for a $\overline{VC}$ to accrue one unit of credit, then since $C_v(t)$ is approximated as $\lfloor C_v(t) \rfloor$, credits increase one by one, i.e., there are no fractional increases, and $\tau_v$ is the period between credit increments.

Figure 4G:
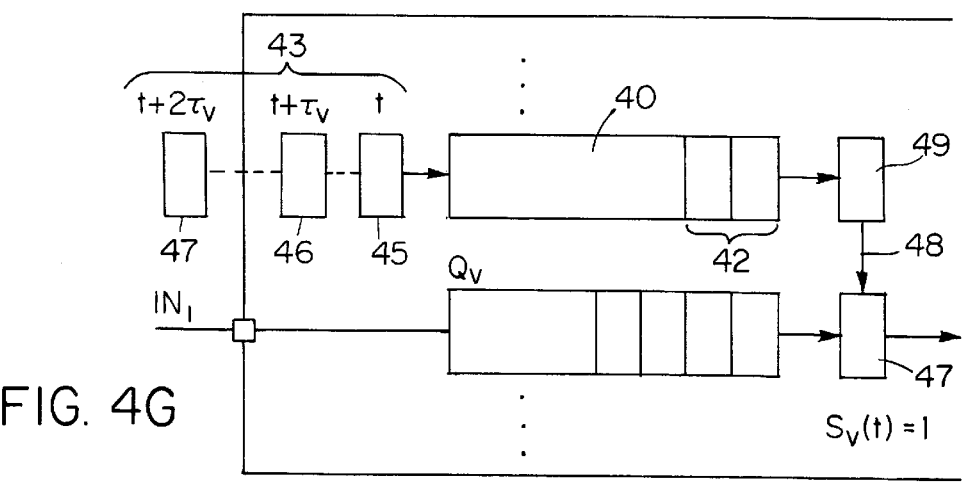

Thus, in FIG. 4G, there are two full credits 42 and no fractional credit. Additional credits 43 are added to the credit buffer 40 at the rate of one credit every $\tau_v$ timeslots. Thus if a credit 45 is accrued at timeslot t, then another credit 46 is accrued at timeslot $t+\tau_v$ and another at $t+2\tau_v$, and so on. Of course, $\tau_v$ itself is not confined to integer values. For example, if $g_v=2/5$, then $\tau_v=5/2$, meaning that every five timeslots two credits should be created. One implementation is to accrue both at once, every five timeslots. Another implementation might accrue a first credit after two timeslots and a second credit after three timeslots.

In practice it is likely that several VCs share the same input-output pair. In this case each VC has its own guaranteed rate. However, for the sake of simplicity we temporarily restrict each VC to a distinct input-output pair. This restriction is removed below. Thus, we can write $g_{ij}$, $L_{ij}(t)$, etc., when we mean $g_v$, $L_v(t)$ where v is the unique VC that goes from input I to output j.

As Equation (2) and FIG. 4G show, credits are depleted by decrementing the value of $C_v(t)$, or equivalently, by removing a credit from the credit buffer, whenever a cell 47 associated with a credit 49 is transmitted. The association is indicated in FIG. 4G by arrow 48.

An input or output port can only send or receive, respectively, one cell per timeslot. To avoid overbooking resources, the network management must ensure that:

$$\Sigma_j g_{ij} \leq 1 \text{ for all;} \quad (3)$$

$$\Sigma_I g_{ij} \leq 1 \text{ for all;} \quad (4)$$

We then define the loading factor of the switch as $$\alpha = \max(\max_i \Sigma_j g_{ij}, \max_j \Sigma_I g_{ij}) \quad (5)$$

that is, the highest fractional load of all input and output ports.

Given these definitions, if queue lengths $L_{ij}(t)$ are used as edge weights at time t, then $E[L_{ij}(t)]$, the expected value of $L_{ij}(t)$, is bounded (using a maximum weighted matching algorithm, and assuming traffic streams are i.i.d. and the loading factor is strictly less than 100%, i.e., $\alpha<1$). See Tassiulas and Ephremides, "Stability properties of constrained queuing systems and scheduling policies for maximum throughput in multihop radio networks," *IEEE Trans. \Automatic Control*, vol.37, no.12, December 1992, pp.1936–1948. and [3].

Similarly, Mekkittikul and McKeown, "A Starvation-free Algorithm for Achieving 100% Throughput in an Input-Queued Switch," ICCCN 1996 states that if waiting times $W_{ij}(t)$ are used as edge weights, then $E[W_{ij}(t)]$ is bounded. Tassiulas, "Linear complexity algorithms for maximum throughput in radio networks and input queued switches," *IEEE INFOCOM* 98, San Francisco, April 1998 states that for the $w=L_{ij}(t)$ case the same is true if a certain class of randomized algorithms are used instead.

The algorithms of the present invention are designed according to the same general principle. Some edge weights are chosen, and we hope that a matching algorithm will make them bounded. Preferred embodiments use edge weights which are functions of $L_v$, $W_v$, $C_v$, i.e., $w(e)=f(L_v(t), W_v(t), C_v(t))$. The function $f()$ is chosen carefully so that a bound for $E[w()]$ corresponds to a precise bandwidth reservation contract. Moreover, the contract can be understood in practical and intuitive terms.

Instead of slow maximum weighted matching algorithms, the present invention uses fast stable marriage matching algorithms and variations. Because such algorithms run faster but are less powerful for the task, we are only able to give a theoretical proof of boundedness in certain cases when the bandwidth reservations make up at most 50% of the switch capacity. However, in simulations, edge weights $w=f(L,W,C)$ are observed to be bounded by small constants at much higher loading, even when 90% of the switch capacity is reserved.

Since all of the scheduling algorithms of the present invention use different edge weights but may use the same matching algorithm, the matching algorithm is explained first. After that, the different edge weights are introduced in successive sections in order of increasing conceptual and implementational complexity.

Stable marriage matching

A study of combinatorial problem of stable marriage matchings first appeared in D. Gate, L. S. Shapley, "College Admissions and the stability of marriage," *American Mathematical Monthly* vol.69, 1962, pp.9–15. In the original context, N men and N women each have a preference list ranking all persons of the opposite sex in order of preference for marriage. A stable marriage is a complete pairing of all men and all women, such that one cannot find a man and a woman, not married to each other, who would prefer each other to their current mate, the idea being that if such a pair exist, they would "run away" and the marriages would not be "stable".

In the context of input-queued switch scheduling, stable marriage matchings have been considered before. See, for example, Nick McKeown, *Scheduling Algorithms for Input-Queued Cell Switches*, PhD Thesis, University of California at Berkeley, May 1995. In this context, each input i ranks all outputs according to the weights $w(e_{ij})$ for all j, and similarly each output ranks all inputs. These rankings comprise the preference lists. Note that while it is possible to transform $N^2$ edge weights into preference lists in this way, the reverse is not always possible, i.e., some sets of preference lists may not correspond to any set of edge weights. Ties in edge weights can be broken by lexicographical order or left unbroken (as a slight generalization of the original problem setting).

Now, the following definition of stable marriage matching can be used. Given a weighted bipartite graph (U,V,E,w), where the weights w associated with each node define that node's preference list, a matching $M \subset E$ is a stable marriage matching if, for any edge $\bar{e} \notin M$, there is an edge $e_M \in M$ such that $e_M$ and $\bar{e}$ share a common node and $w(e_M) \geq w(\bar{e})$. Note that this definition is similar, but not equivalent, to an unweighted maximal matching, i.e., a matching for which it is not possible to add another edge. In an unweighted maximal matching, for every edge unselected $\bar{e} \notin M$, there exists a selected edge $e_m \in M$ such that $e_M$ and $\bar{e}$ share a common node. The definition of a stable marriage matching adds the requirement that $w(e_M) \geq w(\bar{e})$. Thus we also refer to a stable marriage matching as a maximal weighted matching.

Figures 5A, 5B, 5C:
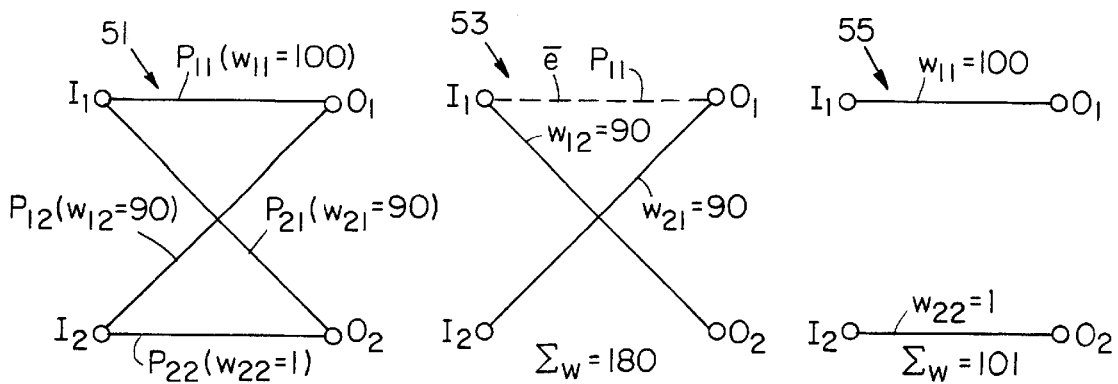
FIGS. 5A–5C are drawings illustrating a weighted graph and related maximum weighted and stable marriage matchings respectively.

FIGS. 5A–5C illustrate a weighted graph and related maximum weighted and stable marriage matchings respectively. FIG. 5A depicts a weighted graph 51 which represents, for simplicity, a 2×2 switch, with two input nodes $I_1$ and $I_2$, and two output nodes $O_1$ and $O_2$. Weights for the paths $P_{11}$, $P_{12}$, $P_{21}$ and $P_{22}$ are indicated by the values $w_{11}=100$, $w_{12}=90$, $w_{21}=90$ and $w_{22}=1$, as shown.

FIGS. 5B and 5C illustrate the two possible maximal matchings derivable from the graph of FIG. 5A, that is, no edges from graph 51 can be added while maintaining a matching. Of the two matchings, FIG. 5B illustrates a maximum weighted matching 53 of the graph of FIG. 5A, comprising edges $P_{11}$ and $P_{22}$, because its total weight, $w_{12}+w_{21}=90+90=180$, is greater than the total weight of any other matching. The total weight of FIG. 5C's matching 55 is $w_{11}+w_{22}=100+1=101$.

Note, however, that although matching 53 of FIG. 5B is a maximum weighted matching, it is not a stable marriage matching. Specifically, edge $P_{11}$, shown as a dotted line, is an edge not in the matching 53 which shares a common node $I_1$, with an edge $P_{12}$ in the mapping 53, wherein $w(P_{11})=100<w(P_{12})=90$.

On the other hand, although the graph 55 of FIG. 5C is not a maximum weighted matching, it is a stable marriage matching.

As defined, stable marriage matchings seem not to have much in common with maximum weighted matchings used in no-speedup scenarios. However, it is proven in Theorem 1 in the appendix that given a weighted bipartite graph (U,V,E,w) with non-negative weights, a stable marriage matching X, and a maximum weighted matching Y, the total weight of X is at least ½ of the total weight of Y. This is a new theoretical result, which, combined with the Lyapunov analysis techniques of Tassiulas and Ephremides, and McKeown, Anantharam and Walrand, allows us to prove that some of our algorithms can support bandwidth reservations of up to 50% of switch capacity, with constant delay bounds.

There are several known algorithms for computing stable marriage matchings. In Gale and Shapley's original algorithm, each man (input) proposes to his most preferred woman (output). Each woman accepts her most preferred proposal so far, and the two become "engaged". Each unmatched man goes on to propose to his next most preferred woman, etc. A woman always accepts her most preferred proposal so far, breaking a previous engagement if necessary, in which case her previous man becomes unmatched again. Gale and Shapley show that the algorithm terminates with a stable marriage.

Figure 6:
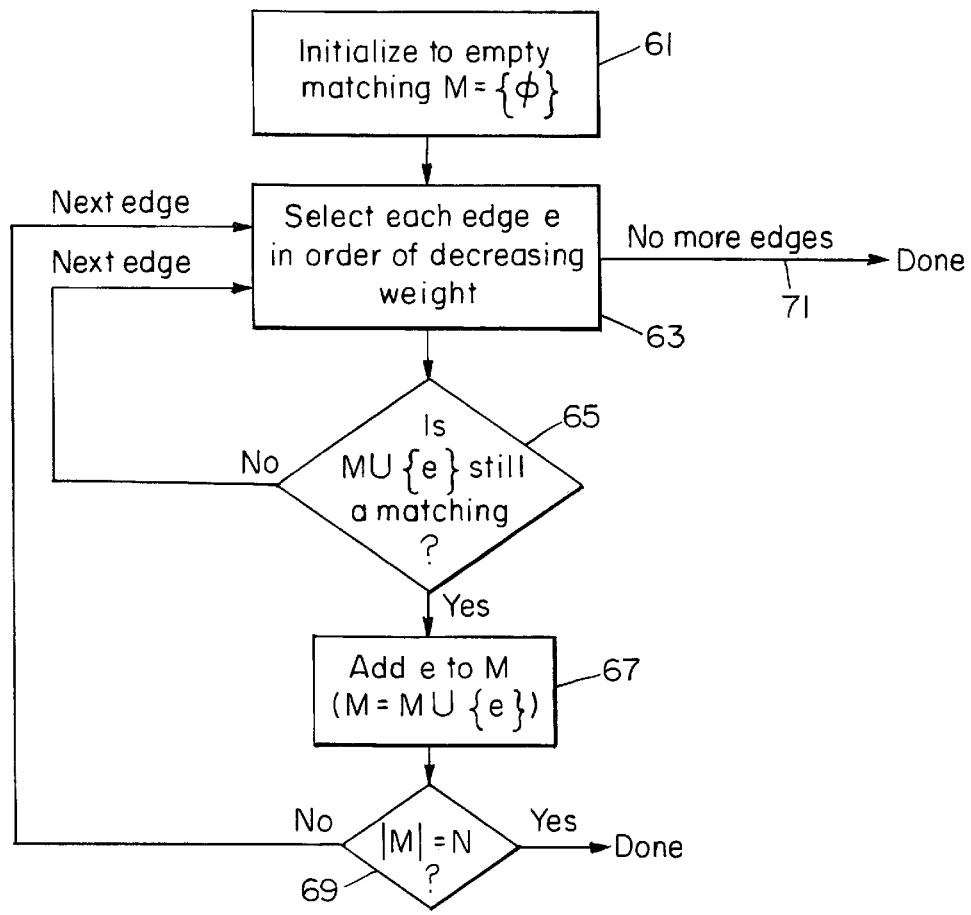
FIG. 6 is a flowchart of the central queue algorithm of the present invention.

A preferred embodiment of the present invention employs a new, slightly faster algorithm which works on all edge weights together, instead of treating them as preference lists. FIG. 6 illustrates this "central queue" algorithm which assumes that edges have been sorted by weight (step 203 of FIG. 3). The algorithm, corresponding to step 205 of FIG. 3, starts, in step 61, with an empty matching M={ø}. Edges are selected for examination in decreasing order of weight in step 63. In step 65, a selected edge e is examined to see if it can be added to M, i.e., if M ∪ e is still a matching. If M ∪ e is a matching, then edge e is added to the matching M in step 67. Otherwise edge e is discarded and the next edge is examined.

The algorithm stops when M has reached its maximum possible size of N edges (step 69), or when all the edges have been examined, indicated by 71.

The central queue algorithm is thus a greedy algorithm with no backtracking, unlike Gale and Shapley's algorithm which allows engagements to be broken off. Theorem 2 in the appendix proves that this central queue algorithm computes a stable marriage matching.

The complexity of both algorithms is the same and equal to $O(N^2)$, i.e., linear in the number of edges, once the edge weights are sorted, i.e., once the preference lists are prepared. In general, sorting would increase the complexity to $O(N^2 \log N)$. However, there are two significant opportunities for lowering the sorting complexity.

First, some of the algorithms of the present invention have the property that, from one timeslot to the next, edge weights change by at most a small constant amount. With this property, the edges can be maintained in sorted order by using a linear, one-pass process to update the sorting from one timeslot to the next.

Figure 7:
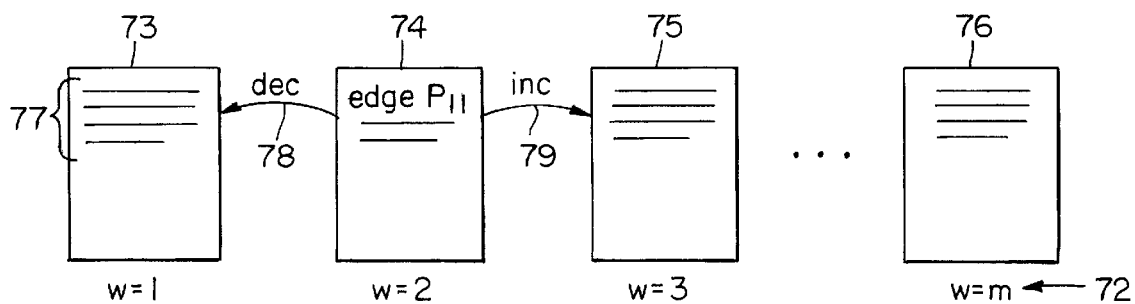
FIG. 7 is a block diagram illustrating the use of doubly-linked lists, or bags, in the central algorithm of FIG. 6.

More precisely, a doubly-linked list of bins as shown in FIG. 7, is maintained, where each bin holds all edges of the same weight. Changing an edge weight simply requires taking the edge from its current bin, or eliminating the bin if this is the last edge, and putting it in a bin corresponding to the new weight, or creating this bin and inserting it into the doubly-linked list if necessary. Increasing or decreasing an edge weight by any constant small amount therefore takes only small constant time, and sorting is maintained in linear $O(N^2)$ time.

FIG. 7 demonstrates the use of these lists, or bins. Several bins 73–76 are shown having associated weights 72 of one, two, three and so on up to some maximum weight m, respectively. Each bin 73–76 is shown containing several edges 77. If an edge $P_{11}$ has a weight of two, it would be in the bin 74 associated with weight two, as shown. If the weight of edge $P_{11}$ is decremented by one, $P_{11}$ is simply moved from the current bin 74 to the previous bin 73 as indicated by arrow 78. Similarly, if the weight of edge $P_{11}$ is incremented by one, $P_{11}$ is moved from the current bin 74 to the next bin 75 as indicated by arrow 79. Now, when the central queue algorithm of FIG. 6 examines edges in descending order, it simply starts with edges in the bin associated with the highest weight, namely bin 76, and works down toward the bin 73 associated with the lowest weight.

Second, in simulations, edge weights were bounded by small integer constants. While a theoretical proof of boundedness cannot be given, this suggests using as many bins as the bound (or twice the bound, to be safe). Edges having weights which exceed the number of bins must still be sorted by a general sorting and so worst-case complexity is still $O(N^2 \log N)$, but actual complexity will usually be linear $O(N^2)$.

Optimization: The update rule.

As an optimization for the above preferred embodiment, at each timeslot, a stable marriage matching M is computed, and compared to the matching M' used in the previous timeslot. Applying current weights to both matchings, the matching with the larger total edge weight is selected for the current timeslot. Thus it is possible that when a particularly high-weight matching is found in one timeslot, it will be used in several subsequent timeslots if the edge weights change only slowly over time. In simulations this optimization was found to slightly improve performance. This optimization correspondes to step 207 of FIG. 3.

Credit-weighted edges

Figure 8:
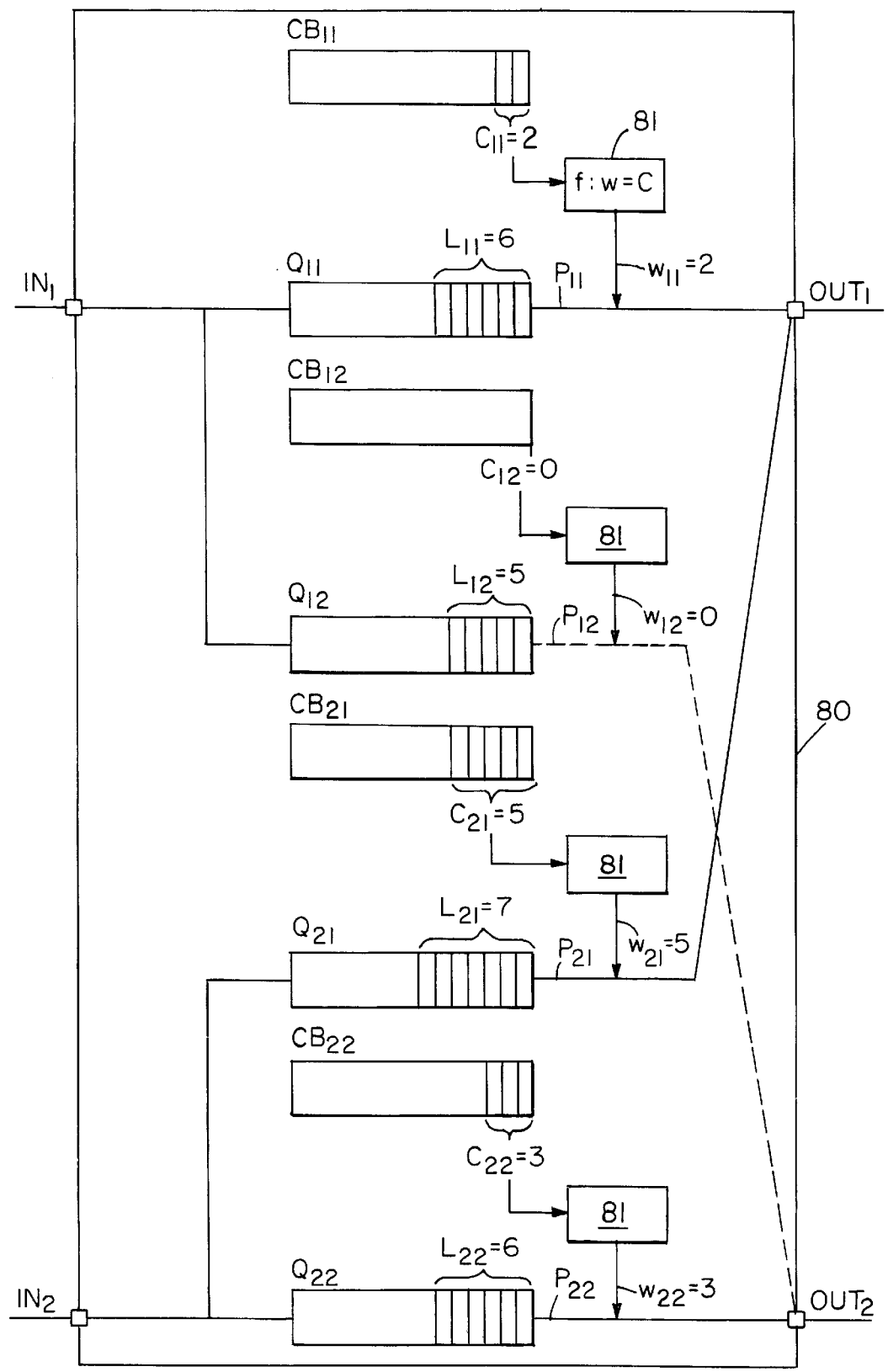
FIG. 8 is a schematic diagram illustrating a credit-weighted embodiment of the present invention.

When all VCs are constantly backlogged, the bandwidth reservation problem is relatively easy to solve. In this scenario queues are never empty, and in fact conceptually this case can be treated as having large queue lengths and waiting times, i.e., $L_{ij}(t) \to \infty$, $W_{ij}(t) \to \infty$. FIG. 8 shows a preferred embodiment for this scenario, using a function which assigns edge weights as the number of credits $w=C_v(t)$. Recall from above that credits accrue, or are assigned, at the guaranteed bandwidth rate $g_v$ for each buffer.

A 2×2 switch 80 is used for exemplary purposes, having two inputs $IN_1$, $IN_2$ and two outputs $OUT_1$, $OUT_2$. Each input/output pair, for example $IN_1/OUT_2$ has a corresponding queue $Q_{12}$ which buffers packets or cells arriving at the input $IN_1$ destined for the output $OUT_2$. In addition, each input/output pair has a corresponding credit buffer $CB_{11}$–$CB_{22}$ in which credits are tracked, and a path $P_{11}$, $P_{12}$, $P_{21}$ and $P_{22}$, respectively, connecting the input to the output. Each path $P_{11}$, $P_{12}$, $P_{21}$ and $P_{22}$ is assigned a respective weight $w_{11}$, $w_{12}$, $w_{21}$ and $w_{22}$ which is calculated as some function 81 of credits, queue length and waiting time, in this embodiment, the number of credits. Here $w=C_v(t)$.

The number of cells in each queue $IN_{ij}$ is indicated by the respective queue lengths $L_{ij}$. Each queue $IN_{ij}$ has some cells, that is $L_{ij}>0$, indicating that the VCs are backlogged. Credit buffer $CB_{11}$ has two credits ($C_{11}=2$), so according to the present embodiment, the corresponding weight $w_{11}$ for path $P_{11}$ connecting $IN_1$ to $OUT_1$ is $w_{11}=2$. Similarly, the weights for paths $P_{12}$, $P_{21}$, and $P_{22}$ are $w_{12}=0$, $w_{21}=5$ and $w_{22}=3$ respectively. Since $w_{12}=0$, path $P_{12}$ is not considered part of the corresponding graph and is therefore drawn as a dashed line.

A 32×32 switch (i.e., N=32) was used in simulations. To control the amount and distribution of guaranteed rates $g_{ij}$, two simulation parameters were used: loading factor $\alpha$, and maximum guaranteed rate $g_{max}$ VCs were randomly generated by considering each different (ij) pair (for all $1 \leq i,j \leq N$) in random order. Each (ij) pair was considered exactly once and the simulator generated $g_{ij}$ as a uniform random variable between 0.01 and $g_{max}$. If the $g_{ij}$ so generated (in conjunction with other $g_{ij}$ already generated) increased the loading factor beyond $\alpha$, then it was decreased as much as necessary to keep the loading factor exactly $\alpha$. (Some VCs therefore might have $g_v=0$.) This method can be viewed as a very simple admission control, wherein VCs arrive at random and request a random amount of bandwidth guarantee, while the admission control maintains each input/output port's loading to $\alpha$ or less.

In most simulations, this method loads every input and output port evenly, close to the loading factor, i.e., $\Sigma_j g_{ij} \approx \Sigma_j g_{ij} \approx \alpha$. Consequently, the total throughput of the switch is approximately $\alpha \times N$. Note that although each port is almost uniformly loaded, this is very different from "uniform loading" which means each input-output pair is uniformly loaded, i.e., each $g_{ij}=\alpha/N$. Our simulations in fact use very non-uniform loading.

As a design choice in our simulator, a VC is not allowed to transmit if its credit is zero (i.e., zero-weight edges are dropped from the stable marriage matching), even if some resources (switch fabric bandwidth) are not used as a result. In other words, the simulated algorithms are not "work-conserving" in the usual sense. In real life such a choice would be unnecessarily wasteful. However, this choice was made in our simulator for two reasons. First, this represents a more stringent test on our algorithms. If they perform well in this scenario, they must perform even better in the non-wasteful scenario.

Second, in some sense a VC without credit has already used up its reserved share of the bandwidth. Therefore, allowing zero-credit VCs to transmit amounts to letting them use unreserved bandwidth. The sharing of unreserved bandwidth is considered a fairness issue and is given a more careful treatment later.

Nevertheless, it is reasonable to ask whether the algorithms of the present invention can exhibit high total throughput. The answer is yes. When augmented with the option to allow zero-credit VCs to transmit, all of the algorithms of the present invention exhibit about 90–100% total throughput. Now that the throughput question is settled, in all the simulations reported in the next few sections, zero-credit VCs are not allowed to transmit and excess bandwidth is simply wasted in order to create a more stringent test condition.

TABLE 1

Credit-weighted algorithm, constantly backlogged traffic

| $g_{max}$ | $\alpha$ | $C_{max}$ |
|---|---|---|
| 0.6 | 90% | 3.0 |
| 0.6 | 80% | 2.2 |
| 0.6 | 50% | 1.5 |
| 0.2 | 90% | 2.4 |
| 0.2 | 80% | 2.0 |
| 0.2 | 50% | 1.5 |

The simulation results are shown in Table 1 for various values of $g_{max}$ and $\alpha$. For each different choice of simulation parameters, the experiment was run ten times. Average figures are shown. The quantity of interest is $C_{max}$, the maximum $C_v(t)$ value achieved during the simulation, for any VC v, and for any timeslot (our simulations run for 100,000 timeslots). This value can be practically treated as a "soft" bound for $C_v(t)$. Now, by definition, $C_v(t)$ is the VC's number of reserved transmissions up to time t, less its total number of transmissions (up to time t), so a bound on $C_v(t)$ can be translated into the following contract:

Any VC v will have its credit bounded $C_v(t) \leq C_{max}$ for all time t. In other words, at any time t, the total number of transmissions $\Sigma_{\tau=1} S_v(\tau)$ will lag behind its reserved share $(t \times g_v)$ by at most a small constant number of cells, equal to $C_{max}$.

This contract implies the following statement of rate equality: The time-average transmission rate equals the guaranteed rate, as $t \to \infty$. In fact, the contract is a much stronger mathematical statement since it bounds the absolute difference between actual and guaranteed transmissions for all t.

The usefulness of the contract depends entirely on the bound $C_{max}$. The smaller the bound, the stronger and more useful the contract. The practicality of the credit-weighted algorithm (for backlogged traffic) derives from the fact that the bounds are very small constants.

Since the edge weights change by at most one every timeslot, the sort order can be maintained from one timeslot to the next with a one-pass linear updating procedure. Complexity is therefore $O(N^2)$.

Theorem 3 in the appendix proves that if the loading factor $\alpha < \frac{1}{2}$, then the contract is satisfied. In other words, this algorithm supports any loading pattern that does not load any input or output to more than 50%. Unfortunately, the theoretically provable bound is very loose compared to typically observed $C_{max}$ values. Thus, the theory is much weaker than the observed performance, which exhibits small bounds even at $\alpha=90\%$ switch capacity. This discrepancy is most likely due to the inherent "looseness" of the Lyapunov proof technique, and the unavailability of combinatorial proof techniques for the no-speedup scenario.

Since the bound $C_{max}$ is obtained by simulation and is not a theoretical bound, one may have reservations about using such a bound in a "contract" or for VC admission control. However, for no-speedup scenarios, Lyapunov analysis often yields loose bounds. No useful combinatorial proof technique is known yet. Moreover, previous works which use Lyapunov analysis in no-speedup scenarios, only bound expected values of queue lengths, waiting times, etc., so that even they are not hard bounds. Thus, a soft bound obtained by simulations can be considered good enough for practical purposes, especially if the VC/user recognizes the bound is obtained by simulations.

In addition, in today's networks there exists a large proportion of legacy, best-effort traffic that requires no bandwidth reservation. Therefore α<½ might not be an unrealistic assumption. In that case "stability" in the sense of bounded edge weights is guaranteed by theory, and the fact that observed bounds are much smaller than the theoretical bounds can be considered a fortunate bonus.

Credit-weighted edges—empty queue exception

The assumption of constant large traffic backlogs may not be realistic, and an algorithm must be able to handle non-backlogged traffic as well. In non-backlogged traffic some queues can be temporarily empty. Such VCs have nothing to transmit and must be ignored. The credit-weighted algorithm of the previous embodiment requires a small and natural modification: VCs with empty queues ($L_{ij}(t)=0$) are ignored by giving them edge weights $w_{ij}=0$ regardless of their actual credit. VCs with non-empty queues still have credits as edge weights, $w_{ij}(t)=C_{ij}(t)$, as before.

Figure 9:
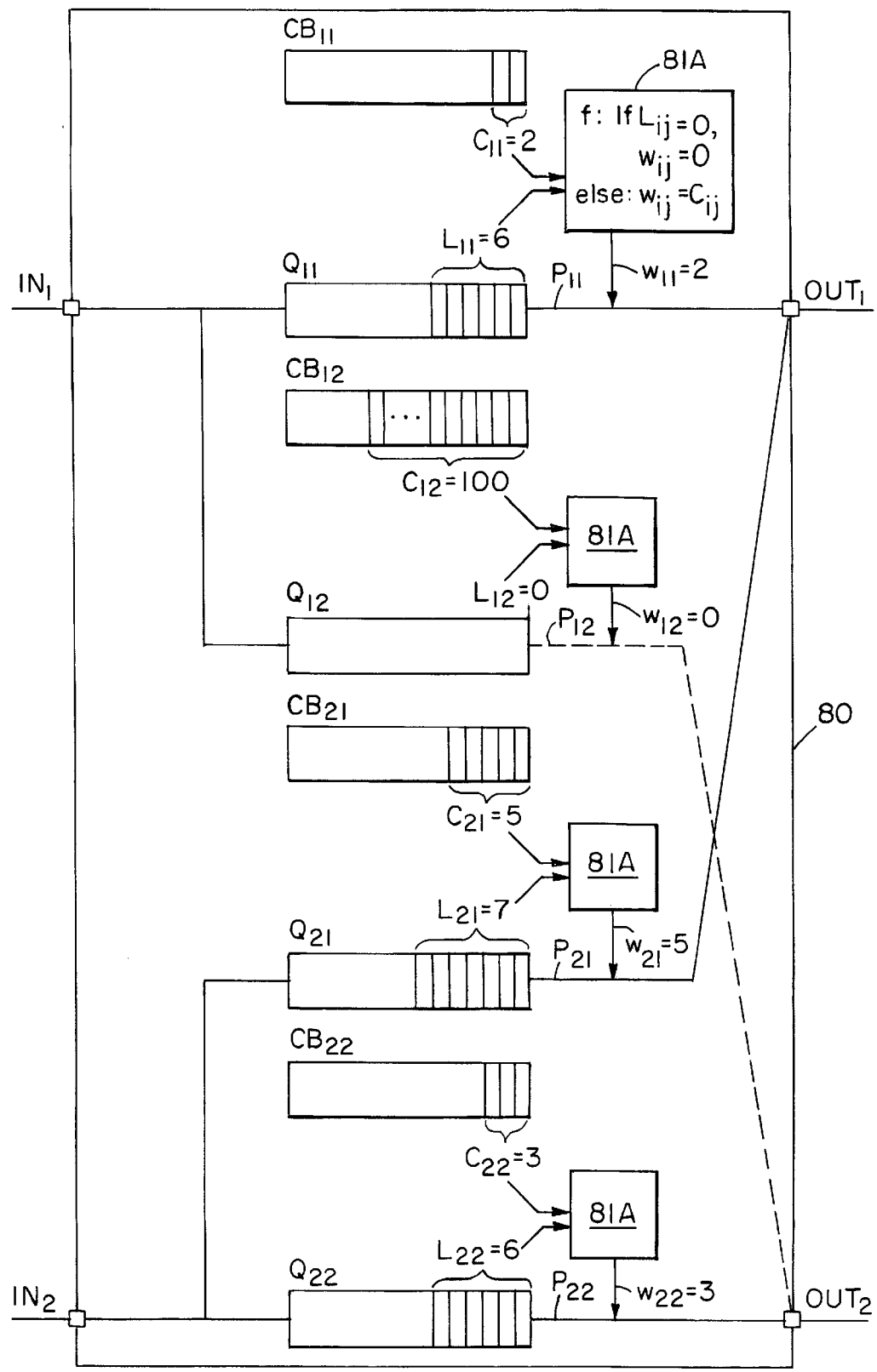
FIG. 9 is a schematic diagram illustrating a credit-weighted embodiment of the present invention in which the weight is zero if queue length is zero.

FIG. 9 illustrates the same switch 80 as FIG. 8 but with the modified function 81A. Here because the VCs are non-backlogged, the queues may be empty. Such is the case for queue $Q_{12}$. Yet this virtual circuit has accumulated $C_{12}=7$ credits. With the weight function 81A of this embodiment, the weight $w_{12}$ assigned to path $P_{12}$ is zero, even though credits are available. Thus, path $P_{12}$ is again drawn with dashed lines to indicate it is not part of the path set.

Two kinds of non-backlogged traffic were used in simulations: Bernoulli traffic and 2-state traffic. These two kinds of traffic share several common features: different VCs are completely probabilistically independent; the number of arrivals $A_v(t)$ is always either 0 or 1; and the average arrival rate $\lambda_v$ is exactly the guaranteed rate $g_v$. We choose $\lambda_v=g_v$ for two reasons. First, if the average arrival rate were higher, the VC would eventually accumulate a large backlog, as discussed in the previous section. On the other hand, if the average arrival rate were lower, the reservations will be larger than the actual traffic that needs to be transmitted and the algorithm's job is correspondingly easier. Therefore, $\lambda_v=g_v$ represents the most stringent test case for non-backlogged traffic.

In Bernoulli traffic, for all t, $\text{Prob}(A_v(t)=1)=g_v$ (and so $\text{Prob}(A_v(t)=0)=1-g_v$). 2-state traffic is more bursty: at each t the VC can be busy or idle. In busy state $\text{Prob}(A_v(t)=1|\text{busy})=2g_v$ whereas in idle state $\text{Prob}(A_v(t)=1|\text{idle})=0$. In some simulations some $g_v$ is allowed to be larger than ½. For such VCs, $\text{Prob}(A_v(t)=1|\text{busy})=1$, $\text{Prob}(A_v(t)=1|\text{idle})=2g_v-1$. This maintains the average arrival rate at $g_v$. State transition (toggling between the busy and idle states) happen with probability 0.2 in each timeslot. Thus lengths of busy or idle periods are exponentially distributed with an average length of five timeslots.

In simulations, the credit-weighted algorithm exhibits much larger (and hence much less useful) bounds, as shown in Table 2. A closer look reveals the reason. When a VC becomes temporarily idle (by entering the idle state in 2-state traffic or by chance in Bernoulli traffic), it simply collects credits, increasing $C_v(t)$ as long as it stays idle, without limit. As long as it is idle (and ignored by the algorithm because $w(e_v)=0$), it does not actually hurt other VCs. However, when cells arrive at this VC, for example, into queue $Q_{12}$ in FIG. 9, it suddenly has a much higher edge weight $W_{12}=C_{12}=100$ compared to others, and thus it hogs its input and output ports for a long time, transmitting every timeslot until its credit drops to a lower level comparable to other VCs. Meanwhile other starved non-empty VCs will accrue credits and their actual transmissions will lag behind their reserved shares by a large amount.

TABLE 2

| Traffic type | $g_{max}$ | α | $C_{max}$ | $LC_{max}$ |
|---|---|---|---|---|
| Bernoulli | 0.6 | 90% | 338 | 142 |
| Bernoulli | 0.2 | 90% | 320 | 32 |
| 2-state | 0.6 | 90% | 641 | 253 |
| 2-state | 0.2 | 90% | 398 | 45 |

A reasonable way to quantify this effect is by measuring the quantity $$LC_v(t) = \min(L_v(t), C_v(t)) \qquad (6)$$

$$= \text{no. of validated or pre-paid cells} \qquad (7)$$

Intuitively, this is the number of validated" or "pre-paid" cells, that is, the number of cells of v that have existing corresponding credits "earmarked" for them already. These cells are not waiting for transmission due to lack of credit. They already have credits and are waiting for transmission simply because of scheduling conflicts in the switch fabric. The bound $LC_{max}$ in Table 2 shows the maximum value of $LC_v(t)$ across all VCs and all timeslots. Both $C_{max}$ and $LC_{max}$ are relatively large, indicating that the credit-weighted embodiments do not perform well for non-backlogged traffic.

Bucket-credit-weighted algorithm

The credit-weighted embodiments described above let idle VCs collect arbitrarily large number of credits. A variation employing a bucket-credit-weighted algorithm explicitly prevents this from happening. Each VC during setup time negotiates a parameter $B_v$ called "credit bucket size," in addition to its guaranteed rate $g_v$. Whenever a VC has an empty queue, if its credit exceeds its bucket size, it no longer receives any credits. In other words credits are updated as follows:

$$C_v(t+1) = C_v(t) - S_v(t) \qquad \text{if } C_v(t) > B_v, L_v(t) = 0 \qquad (8)$$

$$= C_v(t) + g_v - S_v(t) \qquad \text{otherwise.} \qquad (9)$$

FIG. 10, which again shows the same basic 2×2 switch 80 as FIGS. 8 and 9, illustrates this credit bucket size. Three credits 82 are shown "arriving" over time, at the rate of one credit every $1/g_v$ timeslots. Of course, these credits simply accumulate over time, they do not actually arrive from anywhere. However, they can be thought of as arriving for the sake of illustration.

A credit bucket size $B_{ij}$ has been negotiated for each VC and is shown alongside each credit buffer $CB_{11}$–$CB_{22}$. The weighting, function 81B is preferably either of the functions 81, 81A of FIGS. 8 or 9 respectively. Actual weight values $w_{ij}$ are not shown because they depend on the function 81B.

For illustrative purposes, a logical switch 84A–84D allows arriving credits to accumulate in the corresponding credit buffer $CB_{11}$–$CB_{22}$, respectively. However, each switch 84A–84D is controlled by a logic function 83 which implements Equations (8) and (9) above. The table below illustrates the four possible input conditions and the resulting switch state.

|  | $C_{ij}$ | $B_{ij}$ | $L_{ij}$ | $C_{ij} > B_{ij}$ | $L_{ij} = 0$ | Switch |
|---|---|---|---|---|---|---|
| $Q_{11}$ | 3 | 10 | 5 | False | False | Closed (credits accrue) |
| $Q_{12}$ | 8 | 5 | 0 | True | True | Open (no more credits) |
| $Q_{21}$ | 7 | 20 | 0 | False | True | Closed |
| $Q_{22}$ | 10 | 7 | 2 | True | False | Closed |

Figure 10:
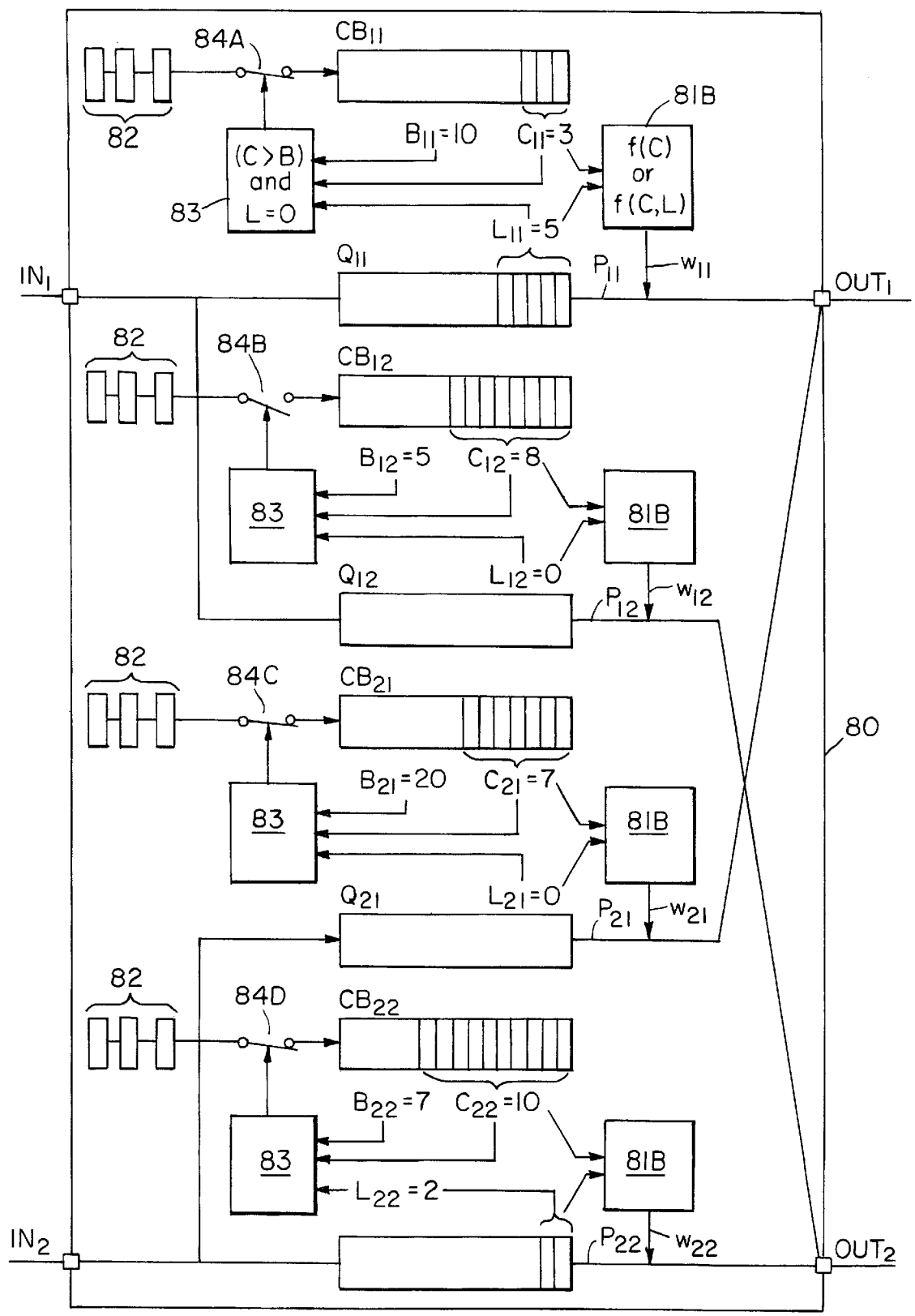
FIG. 10 is a schematic diagram illustrating the concept of credit bucket size used with either of the embodiments of FIGS. 8 or 9.

Note that VCs with non-empty queues such as $Q_{22}$ of FIG. 10 still receive $g_v$ credits as before even if that would exceed its credit bucket size. After all, if a VC is busy and yet its credit exceeds its bucket size, the scheduling algorithm has probably not been serving this VC efficiently. Such a VC must not be further penalized by not receiving credits.

For simplicity, in our simulations every VC has the same bucket size. The algorithm obviously does not require this and indeed, both $g_v$ and $B_v$ are negotiable parameters during VC start-up. If a VC can negotiate a larger $B_v$, the scheduling algorithm will tolerate a higher degree of burstiness from this VC.

TABLE 3

| Traffic Type | $g_{max}$ | $\alpha$ | $B_v$ | $C_{max}$ | $LC_{max}$ | $M_{max}$ | $LCM_{max}$ |
|---|---|---|---|---|---|---|---|
| Bernoulli | 0.6 | 90% | 40 | 40 | 38 | 230 | 170 |
| Bernoulli | 0.6 | 90% | 10 | 10 | 10 | 305 | 170 |
| Bernoulli | 0.2 | 90% | 40 | 40 | 18 | 210 | 135 |
| Bernoulli | 0.2 | 90% | 10 | 10 | 6.8 | 350 | 183 |
| 2-state | 0.6 | 90% | 40 | 40 | 38 | 554 | 350 |
| 2-state | 0.6 | 90% | 10 | 10 | 10 | 505 | 212 |
| 2-state | 0.2 | 90% | 40 | 40 | 18 | 313 | 150 |
| 2-state | 0.2 | 90% | 10 | 10 | 6.8 | 403 | 200 |

Simulation results are shown in Table 3. Note that $C_{max}$ bounds credits for both temporarily idle VCs and busy VCs. Only idle VCs have the credits bounded explicitly by bucket size restrictions. The table shows that busy VCs also have their credits bounded, thereby showing that the algorithm is performing well. The value of $LC_{max}$ can be considered a credit bound for VCs which are "usually busy". The small bounds $C_{max}$, $LC_{max}$ give rise to a useful contract:

1. Any VC v will have its credit bounded $C_v(t) \leq C_{max}$ for all time t. In other words, at any time t, the total number of transmissions will lag behind its reserved share by at most $C_{max}$ cells.

2. Any VC v will have $LC_v(t)$, its number of validated cells, bounded by $LC_{max}$.

3. The above two points are only guaranteed provided that the VC agrees to completely forfeit, without any compensation, any credit it would have received while its queues are empty and its credit already exceeds its bucket size $B_v$.

One way to understand the effect of bucket size is to understand when the VC does not need to worry about it. A VC need not worry about losing credits unless it is idle for a long time. A more precise mathematical statement is that if the VC is busy enough that for any time t, the total number of arrivals up to time t (i.e., $$\left(i.e., \sum_{\tau=1}^{t} A_v(\tau)\right)$$

is at least $t \times g_v - B_v$, then it will never lose credits due to bucket size restrictions.

Another way to understand the effect of bucket size is by simulation and measurement. Our simulation tracks the number $M_v(t)$ of credits a VC has forfeited due to bucket size restrictions. In Table 3, $M_{max}$ shows the largest $M_v(t)$ by any VC.

Another measure of interest is $$LCM_v(t) = \min(L_v(t), C_v(t) + M_v(t)). \quad (10)$$

This is the number of validated cells the VC would have if it had an infinite bucket size (and hence would never lose credit). From our simulations, the bounds $M_{max}$, $LCM_{max}$ are not negligible. Thus, the bucket size has a real effect and any VC that agrees to such a contract with a bucket size provision must understand the implications. If the VC is known to be extremely bursty, it might need to negotiate for a better contract, one with a large bucket size or even no bucket size restriction ($B_v = \infty$) or a higher than necessary reserved rate ($g_v > \lambda_v$).

Since the edge weights change up or down by at most one every timeslot, the sort order can be maintained from one timeslot to the next with a one-pass linear updating procedure. Complexity is therefore $O(N^2)$.

Since bucket size restrictions only apply to temporarily idle VCs, it is not clear a priori that the algorithm will bound credits for busy VCs. However, Theorem 4 in the appendix proves that if $\alpha < \frac{1}{2}$ and each VC has a finite bucket size, then all VCs, both busy and idle, have credits bounded. This is true for arbitrary cell arrival patterns. Again, while the theory only guarantees loose bounds at $\alpha < \frac{1}{2}$, simulations show a much better performance of small bounds at $\alpha = 90\%$.

Using the concept of validated cells, the validation time of a cell is defined as the time the cell obtains a matching credit, e.g., if a VC has $C_v(t) > L_v(t)$, then the next cell to arrive will be validated immediately at arrival, whereas if a VC has $C_v(t) \leq L_v(t)$, the next cell to arrive will be validated only when the VC obtains a matching credit for this cell.

Let D denote the delay between a cell's validation time to the time when it is transmitted. Any credit bound $C_{max}$, theoretical or experimental, provided by an embodiment of the present invention implies a theoretical or experimental delay bound respectively. Any cell of VC v will have its delay $D \leq \lceil C_{max}/g_v \rceil$. This is because if a cell is not served within this time, another $C_{max}$ credits would have arrived which, together with the cell's matching credit, would exceed the $C_{max}$ bound. Note that this applies to the bucket-credit-weighted algorithm as well, because as long as the cell under consideration has not been served, the queue is non-empty and so credit bucket restrictions do not apply.

LC-weighted algorithm

Recall that the credit-weighted algorithm on non-backlogged traffic lets idle VCs collect arbitrarily large number of credits. When such a VC becomes busy again, it suddenly has a very high number of credits and hogs its input and output ports for a long time. While the bucket-credit algorithm discussed above is a refinement to the credit-weighted embodiments, other preferred embodiments take a radically different approach whereby the number of validated cells, $LC_v(t)$, rather than the number of credits, is used as an edge weight. The algorithm keeps track of both $C_v(t)$ and $L_v(t)$ for all VCs, and assigns edge weights to either a buffer's length, or to the number of credits associated with the buffer, whichever is less, i.e., $w(e_v) = LC_v(t) = \min(L_v(t), C_v(t))$.

Figure 11:
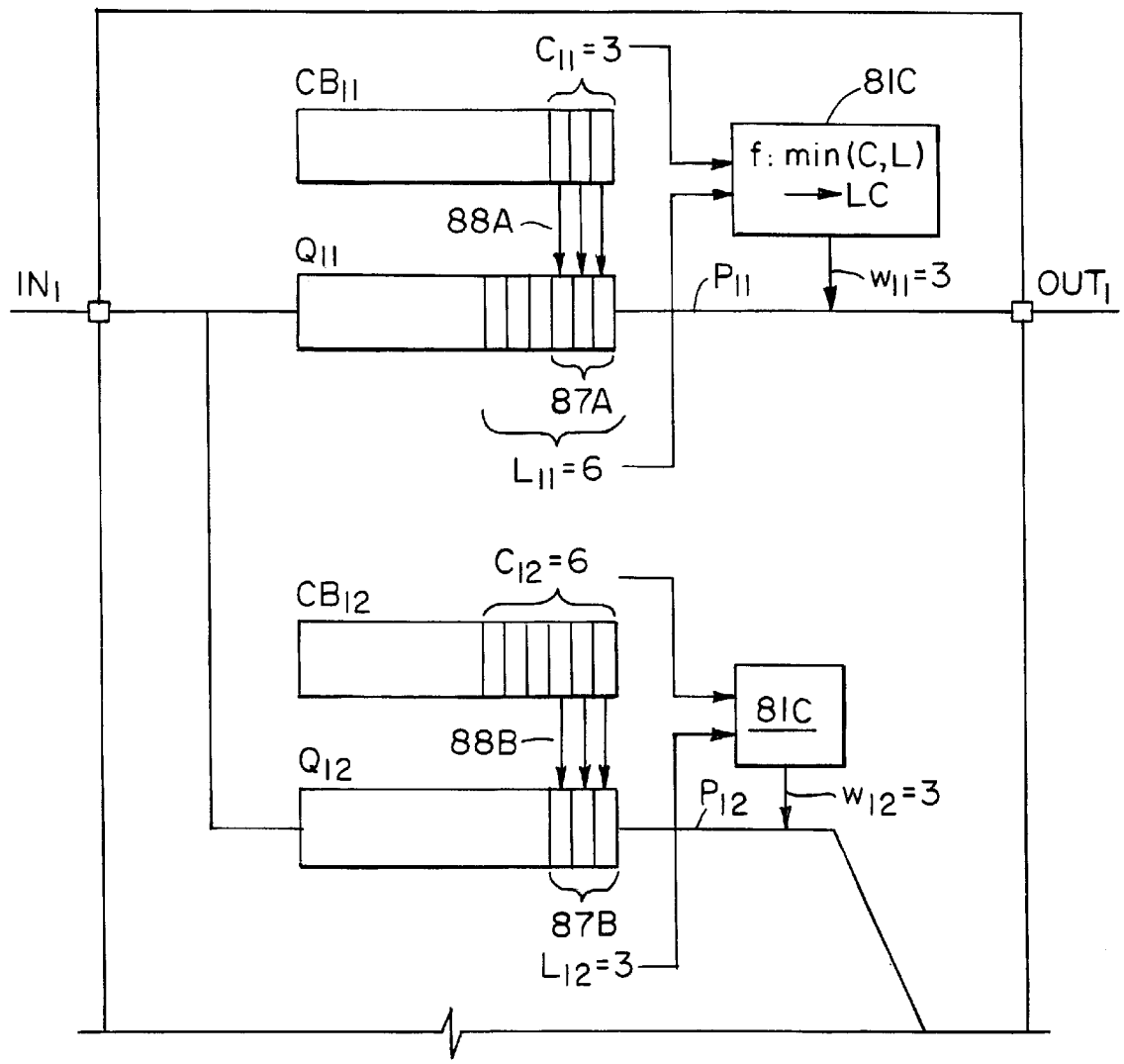
FIG. 11 is a schematic diagram illustrating an LC-weighted embodiment of the present invention in which weights assigned to the paths are based on the number of validated cells.

This approach is illustrated in FIG. 11, which shows the top half of a 2×2 switch 80. Buffer $Q_{11}$ holds six cells so $L_{11} = 6$, however there are only three credits in the credit buffer $CB_{11}$. Therefore, only three cells 87A can be matched to the three credits, as shown by the arrows 88A. These three cells 87A are thus "validated".

The second queue $Q_{12}$ holds only three cells, although there are six credits available in the credit buffer $CB_{12}$. All three cells 87B can thus be validated, again as indicated by arrows 88B. Thus, determining the number of validated cells is equivalent to taking the minimum of the queue length $L_{ij}$ and number of credits $C_{ij}$, as shown in weighting function 81C.

In a preferred embodiment, bucket sizes are not used. However, because the manners in which credits are managed and edge weights assigned are independent issues, an alternative LC-weighted embodiment does employ bucket sizes. In this case, the bucket is applied to outstanding credits, not validated credits.

TABLE 4

| Traffic Type | $g_{max}$ | α | $C_{max}$ | $LC_{max}$ | $L_{max}$ |
|---|---|---|---|---|---|
| Bernoulli | 0.6 | 90% | 369 | 13 | 404 |
| Bernoulli | 0.6 | 50% | 350 | 4 | 242 |
| Bernoulli | 0.2 | 90% | 314 | 7 | 333 |
| 2-state | 0.6 | 90% | 616 | 29.8 | 671 |
| 2-state | 0.6 | 50% | 736 | 6 | 619 |
| 2-state | 0.2 | 90% | 418 | 8.8 | 423 |

Table 4 shows simulation results. The bound $LC_{max}$ gives rise to the following contract:

At any time t, any VC v will have its number of validated cells $LC_v(t)$, i.e., the number of cells that already have credits and are simply waiting due to scheduling conflicts, bounded by $LC_{max}$.

It might not be immediately clear what the contract means, however. Hence it is necessary that the meaning of a bound on $LC_v(t)$ be explained in more practical, customary and intuitive terms.

The main observation is that since $LC_v=\min(L_v, C_v)$, if $LC_v$ is bounded, then at least one of $L_v$ or $C_v$ is bounded. These two cases have quite different interpretations, rephrased in the contract below:

At any time t, for any VC v,

1. If the VC has a large queue ($L_v(t) > LC_{max}$) then its credits must be bounded ($C_v(t) \leq LC_{max}$). In other words its total number of transmissions logs behind its reserved share of $t \times g_v$ cells by at most a small constant number of cells $LC_{max}$. The VC is already transmitting at very close to fall reserved rate. Such a VC can be considered to be "overloading" since $L_v(t) > C_v(t)$.

2. On the other hand, if the VC has a lot of credits ($C_v(t) > LC_{max}$) then its queue size is guaranteed to be small ($L_v(t) \leq LC_{max}$). So, its total number of transmissions lags behind its total number of cells (which is, of course, the maximum number of transmissions possible) by at most a small constant $LC_{max}$. Such a VC can be considered to be "underloading" since $L_v(t) < C_v(t)$.

In short, "overloading" VCs have few unspent credits, and "underloading" VCs have short bounded queues. Both of these cases represent practical, useful contracts.

Table 4 also lists the maximum queue size $L_{max}$ and maximum credit size $C_{max}$. Even though $L_{max}$ is relatively large, the first scenario above implies these VCs are already transmitting at full reserved speed. In addition, even though $C_{max}$ is relatively large, such VCs must have very short queues, by the second scenario. Note that in the original credit-weighted algorithm, such VCs are the ones that hog input/output ports. In the LC-weighted algorithm, however, they have small edge weights and do not cause any trouble at all.

Since the edge weights change up or down by at most one every timeslot, the sort order can be maintained from one timeslot to the next with a one-pass linear updating procedure. Complexity is therefore $O(N^2)$.

We conjecture that if $\alpha < \frac{1}{2}$, then the contract is satisfied, i.e., $LC_v(t)$ is bounded all VCs, both busy and idle. One reason is that if a VC's arrival rate $\lambda_v > g_v$, then in the long term it becomes constantly backlogged with $LC_v(t) \to C_v(t)$, where if $\lambda_v < g_v$, then in the long term $LC_v(t) \to L_v(t)$ and this becomes the scenario of Tassiulas, and McKeown, Anantharam and Walrand. Again, simulation results exceed the conjectured performance.

Validated-waiting-time algorithm

As defined, the above LC-weighted algorithm suffers from an undesirable starvation problem. Suppose a VC goes into a prolonged non-busy period between $t=T_1$ and $t=T_2$, and accumulates many credits during that time. The last cell arriving just before $t=T_1$ will experience a long delay. Throughout the entire period $T_1 \leq t \leq T_2$, the queue length $L_v(t)=1$ (this is the last cell before the period) and so, although credit keeps increasing, $LC_v(t)=1$. This gives the VC very low edge weight and hence very low priority. This starvation problem is common in most queue-length based algorithms.

A preferred embodiment of the present invention fixes this problem by keeping track of waiting times, or ages, of each cell, and having an exception handling mechanism kick in when the waiting time is too large, to decide whether to select the associated buffer. In another embodiment, "phantom" cells arrive to flush out the real cells during long idle periods, i.e., to increment $L_v(t)$ even though there are no true cell arrivals.

In yet another preferred embodiment, queue lengths are not used at all. Rather, validated waiting times associated with the oldest cells of each buffer are explicitly used. Cells are validated when there is a credit available, and the validation time is recorded. The validating waiting time is then calculated from the current time and the validation time.

Recall that $W_v(t)$ denotes the waiting time or delay of the oldest input-queued cell of v, measured in units of timeslots. By convention, a cell arriving in the current timeslot has the minimum waiting time of one, a cell that arrived in the previous timeslot has a waiting time of two, etc. Also by convention, $W_v(t)=0$ if the queue is actually empty. Thus, if the oldest cell still queued arrived at time $t_a$, then at time t, its waiting time is $1+t-t_a$.

Mekkittikul and McKeown, "A Starvation-free Algorithm for Achieving 100% Throughput in an Input-Queued Switch," ICCCN 1996, proved that if the scheduling algorithm uses maximum weighted matchings with $W_v(t)$ as edge weights, then $E[W_v(t)]$ is bounded. We have found an appropriate generalization using only stable marriage matchings in the context of bandwidth reservations.

This generalization is obtained by considering the "validation time" of a cell. More precisely, recall that a queued cell is "validated" if there is an existing credit earmarked for it. The cells of a VC are assumed to be served in order of arrival. Any cell that arrives first must be validated first and also transmitted first.

Suppose a cell c arrives at time $t_a$. If at that instant, there are available credits, then the arriving cell can be immediately validated by an available credit. In this case, the validation time of the cell c is defined to be equal to its actual arrival time $t_a$. If however, at the moment of arrival, a cell cannot be immediately validated, then its validation time is whenever the VC accrues sufficient credit to validate it.

For instance, suppose a new cell arrives at a queue and finds that there are two credits and ten cells ahead of it. Of these ten cells, the oldest two are validated since there are two existing credits. The remaining eight cells are not yet validated. Nine additional credits must be accrued before the new cell can be validated. The first eight of these credits go to validate cells already in the queue, and the ninth credit will validate the new cell. Depending on the exact arrival time in relation to the credit stream, the validation time will fall between $t_a+8\tau_v$ and $t_a+9\tau_v$, where $\tau_v=1/g_v$ is the time it takes to accrue one credit.

With this definition we now define the validated waiting time $VW_v(t)$ in analogy to actual waiting time $W_v(t)$ by replacing the actual arrival time with the validation time. Consider the oldest queued cell c of VC v at time t. If the VC has an empty queue, i.e., c does not exist, or if c has not been validated, i.e., $C_v(t)=0$, then $VW_v(t)=0$. Otherwise $VW_v(t)= 1+t-t_{valid}$ where $t_{valid}$ is the validation time of cell c.

The following equivalent definition is perhaps computationally more useful (depending on the exact implementation of time-stamping):

$$VW_v(t)=\min(W_v(t), T^c_v(t)) \quad (11)$$

where $T^c_v(t)$ is the age (actual waiting time) of the oldest credit of the VC. This is because the oldest credit is automatically earmarked for the oldest cell, so the validated waiting time is the more recent (minimum) of the oldest cell's waiting time and the oldest credit's waiting time. Since credits arrive in a smooth stream, the quantity $T^c_v(t)$ might be easy to calculate. For example, if $g_v=\frac{1}{5}$ then credits arrive every 5 timeslots, in fact, at timeslots t=5, 10, 15, and so on. Thus, if the current time is t=43 and $C_v(t)=3$, the oldest credit must have arrived at time t=30 and $T^c_v(t)=1+43-30=14$.

TABLE 5

Validated-waiting-time algorithm

| Traffic type | $g_{max}$ | α | $C_{max}$ | $VW_{max}$ (timeslots) | $W_{max}$ (timeslots) |
| --- | --- | --- | --- | --- | --- |
| Bernoulli | 0.6 | 90% | 397 | 45 | 1830 |
| Bernoulli | 0.6 | 50% | 322 | 4.3 | 1740 |
| Bernoulli | 0.2 | 90% | 292 | 35 | 3520 |
| 2-state | 0.6 | 90% | 739 | 77 | 4750 |
| 2-state | 0.6 | 80% | 480 | 5.5 | 1050 |
| 2-state | 0.2 | 90% | 389 | 48 | 3330 |

Figure 12:
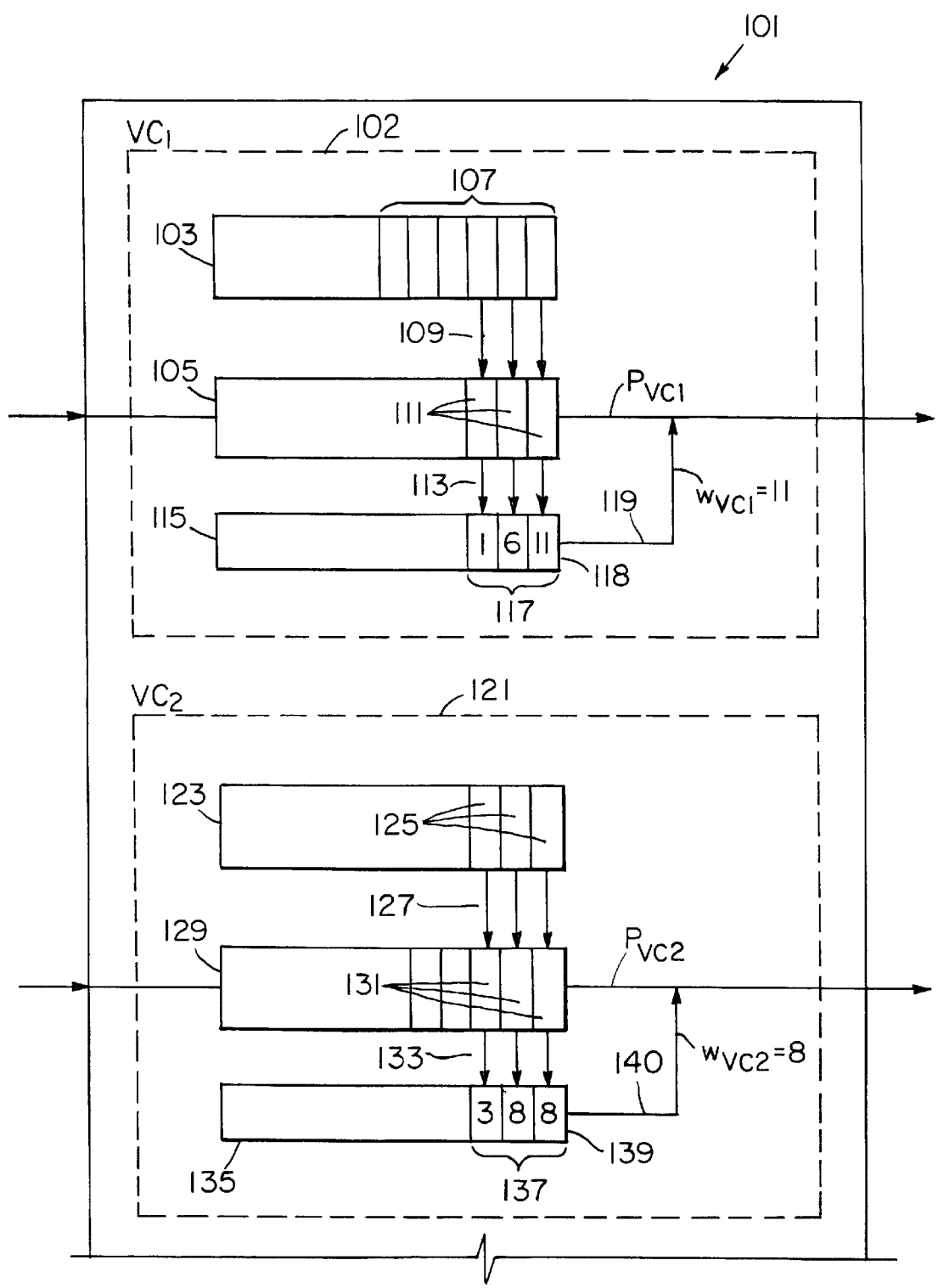
FIG. 12 is a schematic diagram illustrating a validated-waiting-time weighting embodiment of the present invention.

FIG. 12 illustrates a preferred embodiment of the present invention which uses validated waiting times, $VW_v(t)$ as edge weights. Input circuits 102, 121 for virtual circuits, VC1 and VC2 are shown within dashed lines. The credit buffer 103 for VC1 has six credits 107. There are three cells 111 in the queue 105, all of which have been validated, as indicated by the arrows 109. A separate buffer 115 tracks the validated waiting times 117 of the validated cells 111, as indicated by arrows 113. The validated waiting time 118 of the oldest cell, here equal to eleven timeslots, is used as the weight $w_{VC1}$, as indicated by the arrow 119.

The credit buffer 123 for VC2, on the other hand, has only three credits 125, while there are five cells in the corresponding queue 129. Since there are only three credits 125, only three cells 131 are validated, indicated by arrows 127. Again, a separate buffer 135 tracks the validated waiting times 137 of the validated cells 131, and again, the validated waiting time 139 of the oldest cell, here equal to eight timeslots, is used as the weight $W_{VC2}$, as indicated by the arrow 140.

Note that this embodiment requires substantially more bookkeeping than the credit- or LC-weighted algorithms, since we must now keep track of the individual time stamps for each cell in the queue. Simulation results are shown in table 5. $VW_{max}$ is the largest $VW_v(t)$ for all v and all t and again it acts as a practical "soft" bound in our contract:

At any time t, any VC v will have its validated waiting time $VW_v(t)$ bounded by $VW_{max}$.

When the actual waiting times $W_v(t)$ are bounded, that means individual cell delays are bounded. The algorithm of the current embodiment only bounds validated waiting times $VW_v(t)$. What this means, in more customary and intuitive terms, is the following:

At any time t, for any VC v, consider the oldest cell c still in the input queues. Suppose this is the $k_{th}$ cell of this VC ever to arrive, and let $t_a$ be its actual arrival time (thus $t_a \leq t$).

1. If cell c arrived at the same timeslot as its corresponding credit or later ($t_a \leq k \times \tau_v$), or equivalently if the total number of cells arrived zip to $t_a$ (including cell c) is equal to or less than the guaranteed share $$\left(\sum_{\tau=1}^{t_a} A_v(\tau) \leq t\_a \times g_v\right),$$

then c will be validated at once and will have its actual delay bounded by $VW_{max}$ timeslots. (The VC is "underloading" in this case.)

2. On the other hand, if cell c arrived before its corresponding credit, it will have to wait (say, for a duration of t timeslots) before validation. Its actual delay $\leq VW_{max}+T$ but t is not bounded. However, in this case the actual transmissions lags behind the accrual of credits by at most $VW_{max}$ timeslots, or equivalently, at most $VW_{max} \times g_v$ cells. (More precisely, $$\sum_{\tau=1}^{t_a} S(\tau) \geq (t_a - VW_{max}) \times g_{v'})$$

So the VC is transmitting at very close to full reserved bandwidth already. (The VC is "overloading" in this case.)

Both of these cases represent practical, useful contracts.

Table 5 also lists the maximum actual waiting time $W_{max}$ and maximum credit size $C_{max}$. Even though $W_{max}$ is relatively large, the overloading scenario above implies these VCs are already transmitting at full reserved speed. Also, even though $C_{max}$ is relatively large, cells of such VCs must experience small delay according to the above underloading scenario.

If a cell is not transmitted, its edge weight will increase by one in the next timeslot. If a cell is transmitted, however, the next cell's waiting time can be arbitrarily smaller, depending on the inter-arrival duration. Thus, edge weights can change by arbitrary amounts every timeslot. The stable marriage matching algorithms will require a sorting pre-processing step and complexity is therefore $O(N^2 \log N)$.

As a final observation, we have found that validated waiting time may be estimated based on actual waiting time of the oldest cell, the number of credits associated with the buffer, and the rate at which credits accrued. In particular, $$VW'_v(t)=\min(W_v(t), C_v(t) \times \tau_v) \quad (12)$$

is a reasonable approximation to $VW_v(t)$. The reason is that $C_v(t) \times \tau_v \geq T^c_v(t) \geq (C_v(t)-1) \times \tau_v$ because credits arrive in a smooth stream. So comparing the two equations, $VW'_v(t)$ overestimates $VW_v(t)$ but their difference is at most $\tau_v$, and usually much less. For slightly more accuracy, $VW''=\min(W, (C_v-\frac{1}{2}) \times \tau)$ can be used.

Waiting time in units of "tolerable delay"

The validated-waiting-time algorithm bounds every VC's validated waiting time to the same bound $VW_{max}$, regardless of their guaranteed rates or their tolerance for delay. In some applications, however, different VCs may have different tolerance for delay. In that case, it may be more useful to give a bound/contract of the following form:

At any time t, for any VC v, validated waiting time of v is bounded by $K \times D_v$ for some small constant K.

Every VC's validated waiting times is still bounded, but the actual bound is a constant K multiple of each VC's delay tolerance parameter $D_v$, and thus it is different for different VCs. Thus, the validated waiting time is scaled by a constant $(1/kD_v)$ which is inversely proportional to the predetermined tolerable delay $D_v$. The delay tolerance $D_v$ is yet another parameter that can be negotiated during start-up. VCs with stringent delay requirements must try to obtain a small $D_v$. This decouples the rate guarantee from the delay guarantee.

The validated-waiting-time algorithm is easily modified for this feature by substituting $VW_v(t)/D_v$ for $VW_v(t)$ as edge weights. In simulations, the algorithm is still observed to bound the new edge weights to a constant, satisfying the contract. The size of the bound, and hence the usefulness of the contract, depends on the relative sizes of $g_v$, $D_v$, and the product $g_v \times D_v$ for different VCs. The exact dependence is not completely understood yet.

In a preferred embodiment, $D_v = \tau_v = 1/g_v$, i.e., the tolerable delay is the inverse of the guaranteed bandwidth. In other words, the network management does not negotiate rate and delay guarantees separately but instead mandates that slower VCs, i.e., those with small $g_v$, must tolerate proportionally larger delay. In this case the validated-waiting-time algorithm's performance is similar to the LC-weighted algorithm. This is not surprising, since measuring delay in multiples of credit periods $\tau_v$ should be similar to measuring number of outstanding credits, because credits arrive in a smooth stream. However, using validated-waiting-time in units of $\tau_v$ has an advantage over using $LC_v(t)$. The former does not suffer from the starvation problem discussed previously.

Fair Sharing of Unreserved Switch Capacity

By design, the bandwidth reservation algorithms discussed thus far only serve a VC when it can pay the required credit. Since reserved bandwidth usually does not make up 100% of network capacity, the algorithms are not "work-conserving" and lead to under-utilization. How then should the unreserved capacity of the network be used? Various embodiments, corresponding to step 209 of FIG. 3, are now presented which achieve near-maximum utilization and fair sharing of the unreserved capacity, by selecting buffers according to a second matching between remaining inputs and outputs.

The notion of max-min fairness is applied to the unreserved capacity of the network resources as described by Dimitri Bertsekas, Robert Gallager, *Data Networks*, 2nd ed., published by Prentice Hall 1992, p.524. The resources required to support bandwidth reservations are exempted from fairness considerations, but the leftover resources must be shared fairly by all VCs. Max-min fairness is a rate-based notion. The term "excess rate" is used to denote a VC's transmission rate in excess of its guaranteed rate, if any.

A set of VC excess rates, measured in cells/timeslot, is "max-min fair" if and only if every VC has at least one bottleneck resource. A resource is a bottleneck resource for a particular VC if (a) that resource is fully utilized, and (b) that VC has at least as high an excess rate as any other VC using that resource.

As an example, Tables 6-1 through 6-3 shows five VCs in an N=3 switch. Each VC has a different source-destination combination, corresponding to its position in each matrix. All numbers are transmission rates in cells/timeslot. Table 6-1 shows the guaranteed rates granted to the VCs. Two of the five VCs have $g_v = 0$ and they represent best-effort traffic. Input 1, which can support a maximum rate of one cell/timeslot, must use 0.5 of that capacity to support the guaranteed transmissions of the two VCs to Outputs 1 and 2, and therefore only has an excess rate of 0.5 cells/timeslot available for fair sharing. Similarly, output line 2 (column 2) must use 0.4 of its rate of one cell/timeslot to support guaranteed traffic, leaving only 0.6 for sharing.

Using these excess rates, the max-min fair shares of the excess rates are shown Table 6-2. The VCs in the 2nd column have an output line bottleneck and are limited to an excess rate of 0.6/3=0.2 each, while the other two VCs are limited by their respective input lines as bottlenecks. The total rate of each VC is its guaranteed rate plus its fair share of excess bandwidth, shown in Table 6-3.

TABLE 6-1

| | $g_v$ | | |
|---|---|---|---|
| | Out1 | Out2 | Out3 |
| In1 | 0.4 | 0.1 | |
| In2 | | 0.3 | |
| In3 | | 0.0 | 0.0 |

TABLE 6-2 fair shares of excess bandwidth

| | Out1 | Out2 | Out3 |
|---|---|---|---|
| In1 | 0.3 | 0.2 | |
| In2 | | 0.2 | |
| In3 | | 0.2 | 0.8 |

TABLE 6-3

Max-min fairness with Guaranteed Bandwidths total rate

| | Out1 | Out2 | Out3 |
|---|---|---|---|
| In1 | 0.7 | 0.3 | |
| In2 | | 0.5 | |
| In3 | | 0.2 | 0.8 |

Two Phase Usage Weighted Algorithm

Figure 13:
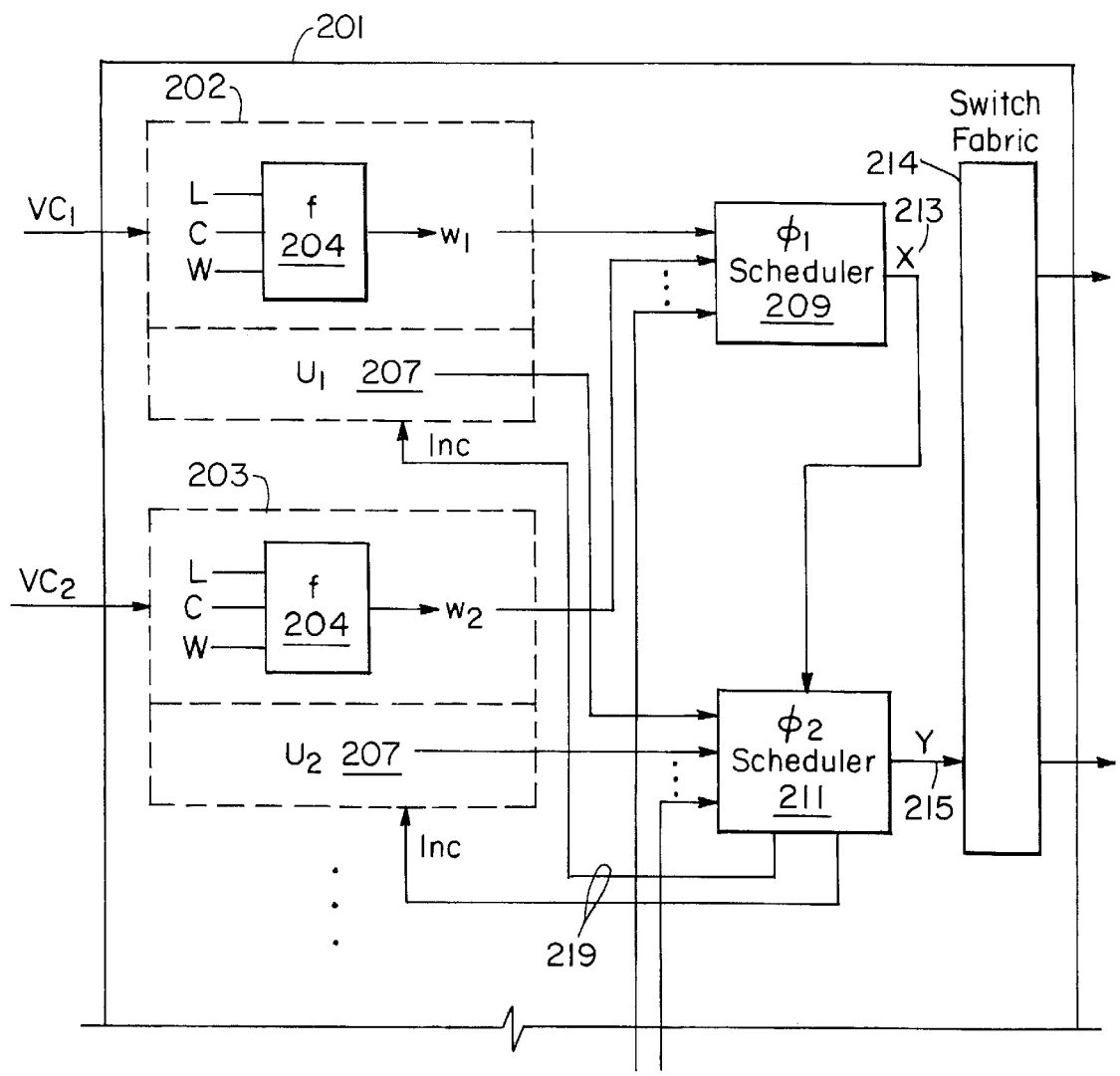
FIG. 13 is a schematic diagram illustrating a two-phase usage-weighted embodiment of the present invention.

FIG. 13 illustrates yet another preferred embodiment which employs an algorithm that operates in two phases in each timeslot, where the weights in the second phase are based on useage. Input circuits 202 and 203 corresponding to two VCs, $VC_1$ and $VC_2$ respectively are shown within a switch 201. In a first phase, any of the previously described bandwidth reservation algorithms, represented boxes 204 and 205, are used to calculate a weight $w_1$, $w_2$, etc. for each VC. The weights $w_1$, $W_2$, etc. are presented to a first phase scheduler 209, which produces a matching X 213 as previously described. The VCs included in the matching X have their credits decremented as usual.

Now, the matching X is presented to a second phase scheduler 211. If |X|<N, i.e., if additional transmissions are possible, additional VCs are chosen during a second phase by the phase two scheduler 211, to fill up the transmission schedule. These VCs have "usage" variables $U_v$, which, initially set to zero, are incremented by one under control 219 of the phase two scheduler 211. Thus each $U_v$ counts the number of cells a VC has sent but for which no credits have been paid, i.e., the number of "excess" or unpaid transmissions. By design, the greedy reservation algorithms of the present invention never miss a busy VC which has a credit to spend. Therefore, all of the VCs chosen during the second phase have no credit, i.e., $C_v=0$.

The idea is that to be fair, VCs which have few previous excess transmissions (small $U_v$) should be considered first in the sharing of excess resources. The second phase Usage Weighted Algorithm implements this directly as follows. Each VC is considered in increasing $U_v$ order, and is added to the matching X if possible. Otherwise, the VC is skipped. There is no backtracking. This is identical to the central queue algorithm except that the weights $U_v$ are sorted in increasing order, and the initial matching X 213 is computed in the first phase. The resulting matching Y 215 thus specifies transmissions across the switch fabric 214 for the current timeslot.

Usage-Credit Weighted Algorithm

Figure 14A:
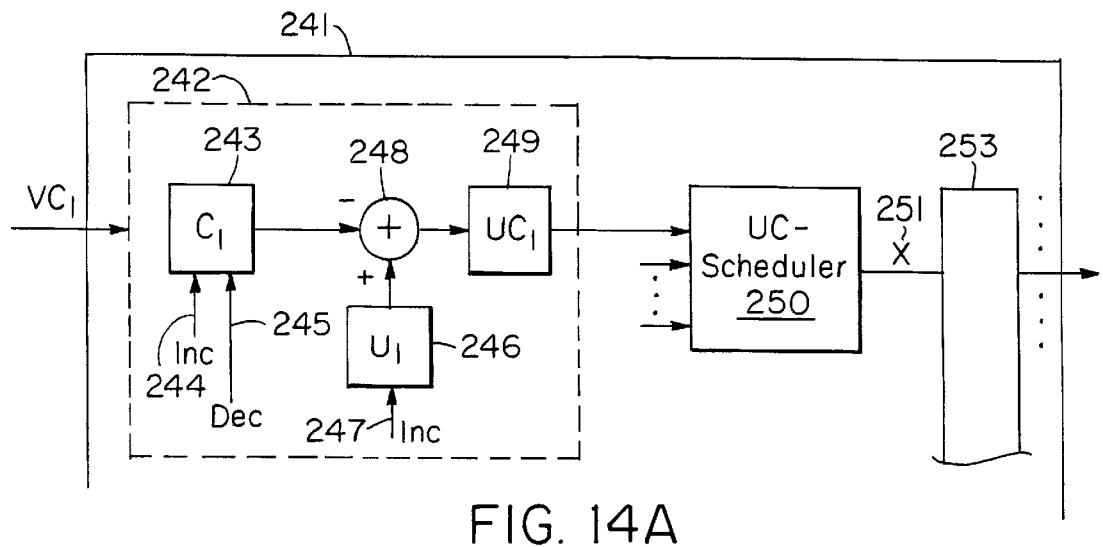
FIGS. 14A–14C are schematic diagrams illustrating a single-phase usage-credit-weighted embodiment of the present invention.

FIG. 14A illustrates still another preferred embodiment 241, in which the (bucket-)credit weighted algorithm and the usage-weighted algorithm are combined into a single usage-credit weighted algorithm. In this algorithm, portrayed as a circuit 242, all VCs are sorted by the difference $UC_v=U_v-C_v$. Credits 243 are maintained as usual by incrementing $C_v$ at regular intervals of $\tau_v$, timeslots via control 244, and decremented via control 245 when a cell is validated, i.e. the credit is paid for. Usage variable $U_v$ 246 is maintained as described above by incrementing it via control 247. At 248, $C_v$ is subtracted from $U_v$, effectively applying credits "retroactively" to previous excess transmissions, which are now accounted for as guaranteed transmissions. The resulting edge weights $UC_v$ 249 measure the number of excess transmissions under this accounting scheme.

A UC-scheduler 250 considers all VCs in increasing $UC_v$ order in a single pass by dealing with bandwidth reservations and fair sharing together. When a VC transmits a cell, its $C_v$ is decremented if $C_v>0$ originally, otherwise its $U_v$ is incremented. In either case, its $UC_v$ will therefore be increased by one in the next timeslot. The output of the scheduler 250 is a matching X 251 which is applied to the switch fabric 253.

Figure 14B:
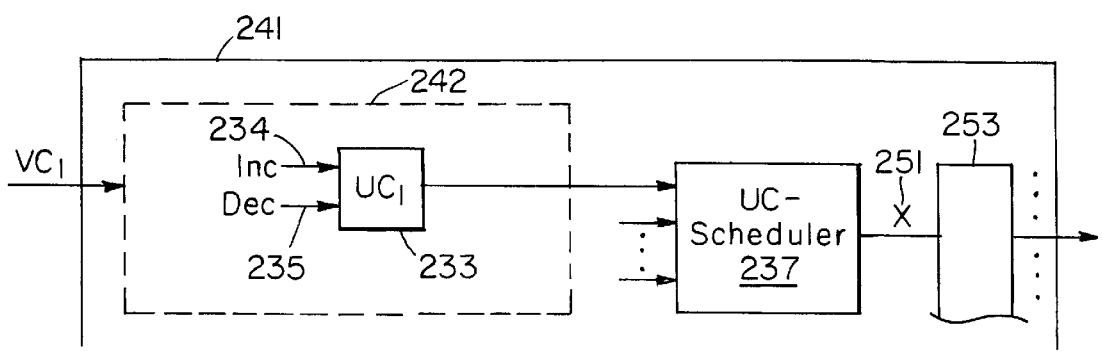

FIG. 14B illustrates a practical optimization in which the algorithm tracks just one variable, $UC_v$ 233, per VC. This variable 233 is incremented via control 234 when a cell is sent, and decreased via control 235 when credits are received.

Figure 14C:
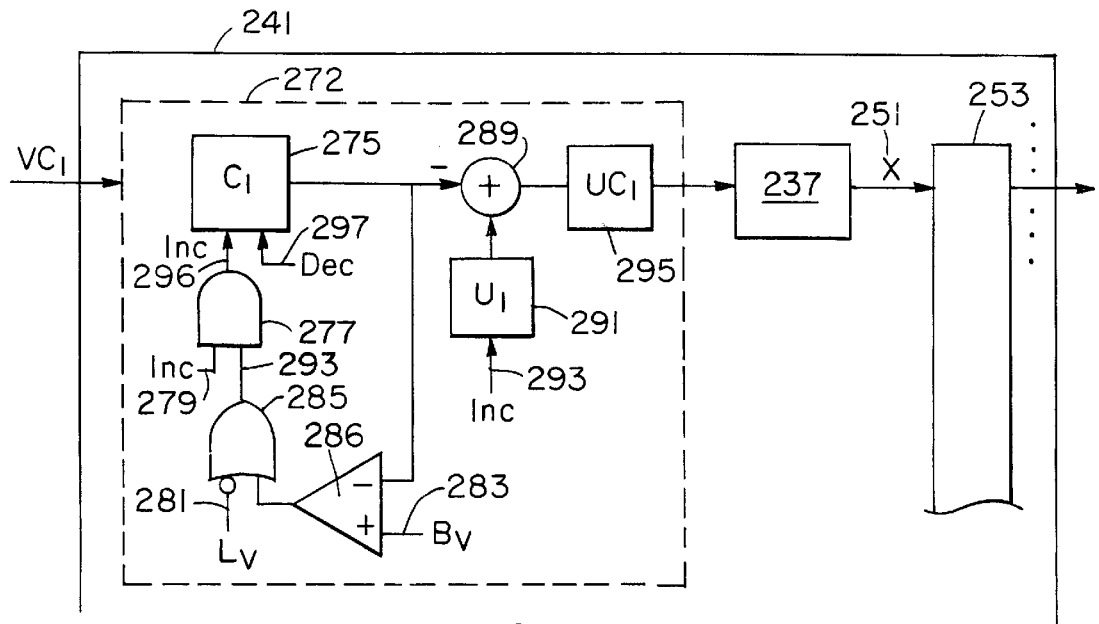

If bucket sizes are used, credits $C_v$ must still be tracked separately. This is illustrated in FIG. 14C in a sample schematic. Here, the number of credits $C_v$ 275 for a given VC v is compared at comparator 286 with the bucket size $B_v$ 283. The output of the comparator 286 is ORed at OR gate 285 with a signal 281 which indicates that the corresponding queue is empty ($L_v=0$), which is inverted at the input to the OR gate 285. The output 293 of OR gate 285 is ANDed with the normal credit increment control 279 to act as a gate to allow or disallow accruing of additional credits. As with the embodiment of FIG. 14A, the resulting value of $C_v$ 275 is subtracted from the usage count $U_v$ 251 to form a usage-credit weight 295.

Since VCs are considered in increasing $UC_v$ order, those VCs with negative $UC_v$ are considered first. For these VCs, $-UC_v=C_v-U_v$ is positive and represents the amount of unspent credits. Thus the first part of the usage-credit weighted algorithm, using the central queue algorithm to choose VCs in increasing $UC_v$ order with most negative $UC_v$ first, is equivalent to the (bucket-)credit weighted algorithm, using the central queue algorithm to choose VCs in decreasing $C_v$ order.

Table 7 shows the performance of the UC-weighted algorithm in simulations. The total number of VCs shown in the table includes those with a non-zero bandwidth guarantee, and those with no bandwidth guarantee. The latter represents best-effort traffic. All VCs have random input and output ports, both chosen uniformly among the N=32 ports. The generation of each VC's guaranteed rate is done as before, subject to the same simple "admission control" of not loading any input or output beyond $\alpha$. Backlogged traffic represents an overloading scenario where all VCs are constantly backlogged. When Bernoulli traffic is used, each VC's arrival rate equals its guaranteed rate plus a small constant. In each test case the small constant is adjusted so that the total arrival rate of all VCs equals N cells/timeslot, the highest possible throughput of the switch. This represents an exact loading scenario.

Table 7 shows that total switch throughput is usually very high. (For Bernoulli traffic, the throughput is affected by the arrival processes and therefore not very meaningful.) The algorithm's performance regarding fairness is measured by the parameter $\delta_v$, defined as the ratio of a VC's excess transmission rate over its fair excess rate (computed offline). A VC which gets less than its fair share will have $\delta_v<1$, and a VC which gets more than its fair share will have $\delta_v>1$. The table shows the distribution of all $\delta_v$ values and also the minimum value. It shows that many VCs (at least 85% of them) obtain at least 95% of their fair shares. However, a small fraction of VCs might be treated very unfairly (small $\delta_v$) under some settings. The simulation results are similar for the two phase algorithm. In practice, the one-phase usage-credit weighted algorithm may be preferable to the two phase algorithm because of its simpler implementation and resulting faster running time.

TABLE 7

| | | no. of | | | | % of VCs with $\delta_v$ in these ranges | | | |
|---|---|---|---|---|---|---|---|---|---|
| Traffic type | $g_{max}$ | VCs with non-zero GBW | total no. of VCs | $\alpha$ | min ($\delta_v$) value | min ($\delta_v$) to 0.7 | 0.7 to 0.85 | 0.85 to 0.95 | 0.95 or more | Total switch throughput |
| backlogged | 0.6 | 160 | 2048 | 90% | 0.171 | 1.5% | 2.0% | 3.1% | 93.4% | 98.5% |
| backlogged | 0.6 | 155 | 1024 | 90% | 0.159 | 4.0% | 4.3% | 5.8% | 85.9% | 92.5% |
| backlogged | 0.2 | 312 | 1024 | 90% | 0.087 | 3.8% | 3.5% | 4.6% | 88.1% | 91.2% |
| backlogged | 0.2 | 204 | 1024 | 50% | 0.413 | 1.0% | 2.2% | 2.3% | 94.5% | 97.3% |

TABLE 7-continued

| Traffic type | $g_{max}$ | no. of VCs with non-zero GBW | total no. of VCs | α | min ($\delta_v$) value | % of VCs with $\delta_v$ in these ranges | | | | Total switch throughput |
|---|---|---|---|---|---|---|---|---|---|---|
| | | | | | | min ($\delta_v$) to 0.7 | 0.7 to 0.85 | 0.85 to 0.95 | 0.95 or more | |
| backlogged | 0.2 | 201 | 2048 | 50% | 0.161 | 0.4% | 1.0% | 1.7% | 96.9% | 99.0% |
| Bernoulli | 0.2 | 204 | 1024 | 50% | 0.672 | 0.04% | 0.4% | 1.5% | 98.1% | — |
| Bernoulli | 0.2 | 201 | 2048 | 50% | 0.614 | 0.1% | 0.8% | 1.6% | 97.5% | — |

Multiple VCs per input-output pair

Figure 15A:
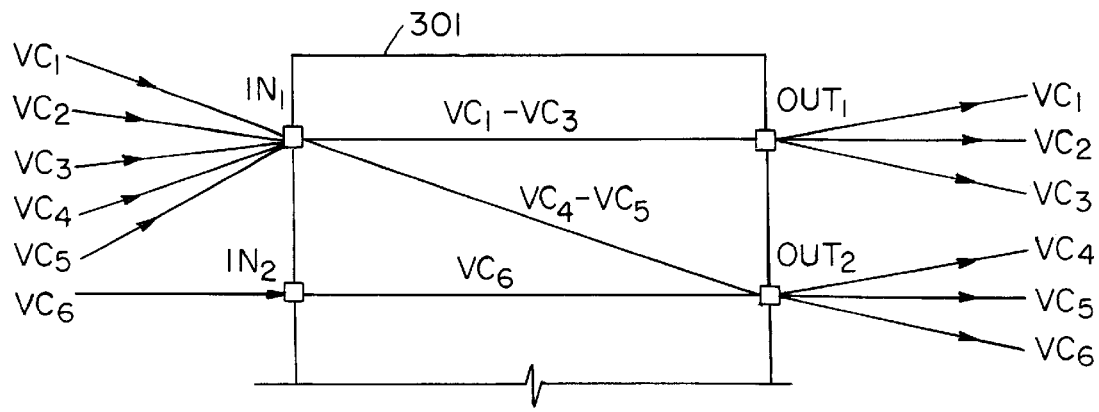
FIGS. 15A–15B are schematic diagrams illustrating multiple VCs per input-output pair.

In practice it is likely that several VCs have the same input-output pair, as illustrated in FIG. 15A. Here, three VCs, $VC_1$–$VC_3$, all enter the switch 301 at input $IN_1$ and exit through $OUT_1$. Similarly, $VC_4$ and $VC_5$ share input $IN_1$ and output $OUT_2$. Lastly, $VC_2$ in unique in that it does not share an input/output pair with any other VC.

In this case each VC has its own guaranteed rate. Moreover, providing rate and delay guarantees to each individual VC means that per-VC queuing, is required.

One might be tempted to let the scheduling algorithm lump all such VCs together as one "super" VC with a combined guaranteed rate. However, among these VCs, the scheduling algorithm must then devise some separate round-robin or priority scheme to ensure each VC obtains its own rate and/or delay guarantee.

Figure 15B:
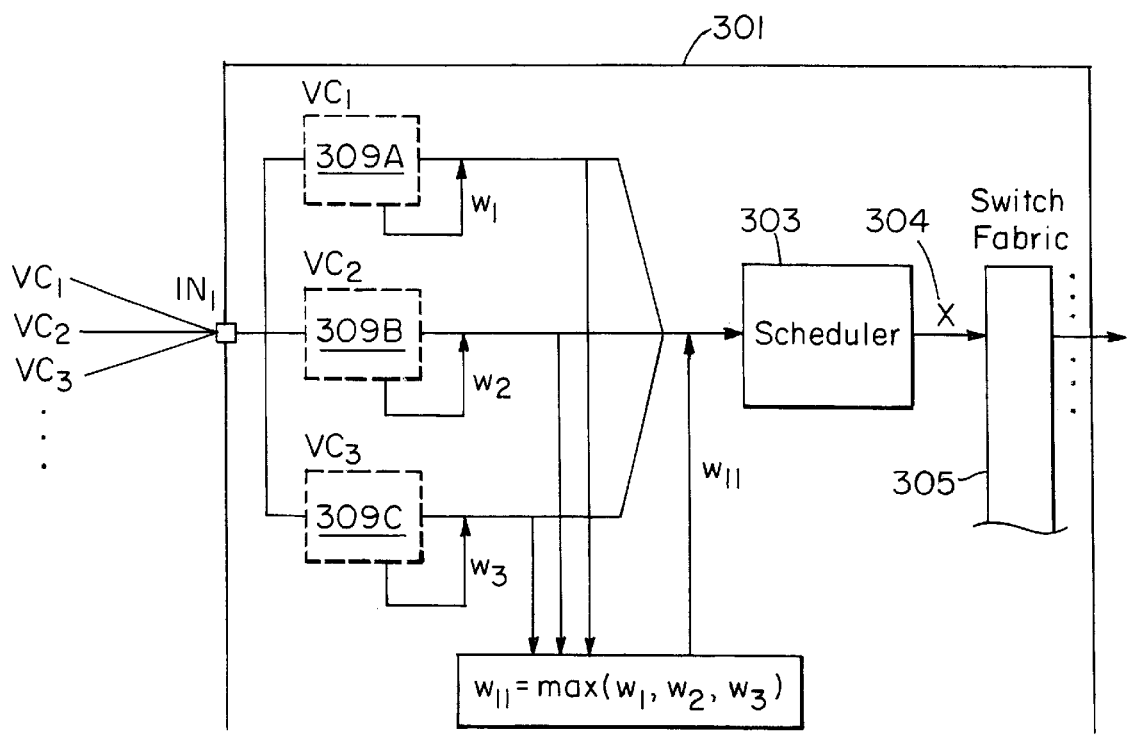

FIG. 15B illustrates a preferred embodiment of the present invention in which the scheduling algorithm keeps track of each VC, e.g. $VC_1$, $VC_2$, $VC_3$, etc., separately—separate $C_v$, $L_v$, $LC_v$, $W_v$, $VW_v$, $U_v$, and whatever other parameters the scheduling algorithm requires, within the corresponding input circuits 309A–309C respectively. Each circuit 309A–309C produces a corresponding weight $w_1$–$w_3$ respectively. Conceptually, the bipartite graph becomes a multi-graph where there may be different edges, each representing a different VC, connected to the same two nodes/ports. However, since the reservation algorithms of the present invention are greedy and are only interested in choosing high edge weights, a simple preprocessing 307 can trim the multi-graph into a normal graph, preferably by choosing the edge of highest weight between any input-output pair, resulting in, for example $w_{11}$ of FIG. 15B, which is then fed to the scheduler 303, as usual, to produce a matching X 304 which is applied to the switch fabric 305.

Similarly, the fairness algorithms of the present invention can trim the multi-graph by keeping only the edge of lowest weight between any input-output pair.

While this invention has been particularly shown and described with references to preferred embodiments thereof, it will be understood by those skilled in the art that various changes in form and details may be made therein without departing from the spirit and scope of the invention as defined by the appended claims.

For example, the same principle of choosing appropriate edge weights and bounding them might be more widely applicable to achieve other kinds of QoS contracts, e.g., delay variation guarantees, fairness based on waiting times (unlike rate-based max-min fairness), etc.

APPENDIX

Proofs of Theorems

Theorem 1 (Stable marriage matchings have half the maximum weight) Given a weighted bipartite graph (U, V, E, w) with non-negative weights, a stable marriage matching X, and any other matching Y, the following inequality holds:

$$W(X) \geq W(X \cap Y) + \tfrac{1}{2} W(Y - X \cap Y)$$

where W() denotes the weight of a matching (i.e., sum of its edge weights), and the ∩ notation denotes set intersection, i.e., X∩Y denotes all edges in both X and Y, and Y−X∩Y denotes all edges in Y but not in X.

In particular, since all edge weights are non-negative, we have:

$$W(X) \geq W(X \cap Y) + \tfrac{1}{2} W(Y - X \cap Y) \geq \tfrac{1}{2} W(X \cap Y) + \tfrac{1}{2} W(Y - X \cap Y) = \tfrac{1}{2} W(Y).$$

Further, take Y=a maximum weighted matching and this theorem implies that any stable marriage matching has at least ½ the maximum weight.

Proof of theorem 1: Let X be a stable marriage matching and Y be another matching. Let Z=X∩Y (edges in both X and Y), $\hat{X}$=X−Z (edges in X but not in Y), and $\hat{Y}$=Y−Z (edges in Y but not in X). We will prove the following equivalent statement:

$$\tfrac{1}{2} W(\hat{Y}) \leq W(\hat{X}).$$

The theorem will then follow by adding W(Z) to both sides and noting that $W(Z)+W(\hat{X})=W(X)$.

Since X is a stable marriage matching, every edge $e_{\hat{Y}} \in \hat{Y}$ has a higher-or-equal-weight blocking edge in X, denoted by block ($e_{\hat{Y}}$). Note: In case $e_{\hat{Y}}$ has two higher-or-equal-weight blocking edges, we can assume (without loss of generality) that each edge has a numeric unique identifier (assigned arbitrarily, e.g., VC ID) and let block($e_{\hat{Y}}$) denote the one with a smaller unique identifier.

Here are some simple properties of edges $e_{\hat{Y}} \in \hat{Y}$ and their blocking edges:

1. block($e_{\hat{Y}}$) ∈ X and w(block($e_{\hat{Y}}$))≥w($e_{\hat{Y}}$), by definition.
2. block($e_{\hat{Y}}$) ∉ Y, because Y, being a matching, cannot contain both $e_{\hat{Y}}$ and its blocking edge. Combining block($e_{\hat{Y}}$) ∈ X and block($e_{\hat{Y}}$) ∉ Y, we have block($e_{\hat{Y}}$) ∈ −X∩Y=$\hat{X}$.
3. Any $e_{\hat{X}}$=(u, v) ∈ $\hat{X}$ can only block at most two different edges in $\hat{Y}$. This is because Y is an matching and contains at most one edge connecting to u and at most one edge connecting to v.

Now let the edges of $\hat{Y}$ be explicitly listed as $\{e_1, e_2, \ldots e_k\}$. We have:

$$w(e_1) \leq w(\text{block}(e_1))$$
$$w(e_2) \leq w(\text{block}(e_2)) \ldots$$
$$w(e_k) \leq w(\text{block}(e_k))$$

Summing up all equations, the sum of the left sides=$w(e_1)+\ldots+w(e_n)=W(\hat{Y})$. On the right sides, every block($e_i$) ∉ $\hat{X}$, and any edge in $\hat{X}$ can appear at most twice, thus sum of the right sides≤2×W($\hat{X}$). (Note that this uses the assumption that edge weights are non-negative.) This proves the required $W(\hat{Y}) \leq 2W(\hat{X})$.

Theorem 2 (Correctness of Central Queue algorithm)

When the Central Queue algorithm terminates. M is a maximal weighted matching.

Proof: Let $M_{final}$ denote the value of M when the algorithm terminates. Now consider an edge $e' \notin M_{final}$. There are two cases, which together directly satisfies the definition of stable marriage matchings:

1. The algorithm terminates before e' is considered. This can only happen when $|M_{final}|=N$, so that there is some blocking edge $e \in M_{final}$ that shares a common node with e'. Because of the sort order, we have $w(e) \geq w(e')$.
2. The algorithm has considered e' at some point. Suppose that when e' is considered, the matching is $M_1 \subset M_{final}$. By design, the only possible reason why e' is not added is that $M_1 \cup \{e'\}$ is not a matching, or equivalently, there exists $e \in M_1 \subset M_{final}$ such that e', e share a common node. However, $e \in M_1$ means that e has already been considered at that point, i.e., $w(e) \geq w(e')$ because of the sort order. Therefore e' has a blocking edge $e \in M_{final}$ with higher or equal weight.

Theorem 3 (Credit-weighted algorithm supports 50% reservations with backlogged traffic)

If $\alpha < \frac{1}{2}$ and all VCs are constantly backlogged, then the credit-weighted algorithm guarantees that there is ai bound $C_{max}$ such that, at any time t, for any VC f, the VC's credit $C_f(t) \leq C_{max}$. This result holds whether the edge weights are fractional credits or an integral approximation, i.e., $\lfloor C_f(t) \rfloor$.

Proof: Assume all VCs are constantly backlogged, $\alpha < \frac{1}{2}$ and the algorithm is used as described. We will prove that the quantity $V(t) = \Sigma_f C_f(t)^2$ is bounded, which would imply all $C_f(t)$ are bounded. This proof here is adapted from [1, 3] which (unlike this work) deal with maximum weighted matchings.

Let $S_f(t)$ denote the number of cells transmitted by VC f at time t. Then, $S_f(t)=0$ or 1, and the set of zero-one values $\{S_f(t)\}_{all\ f}$ specifies the maximal weighted matching chosen at time t. Moreover, $\Sigma_f[C_f(t)S_f(t)]$ is the total weight of this matching. Note that since the algorithm ignores VCs with $C_f(t) \leq 0$, those VCs will automatically have $S_f(t)=0$. (This also ensures that no $C_f(t)$ will drop below $-1$, since only positive $C_f(t)$ are decremented, and they decrease at most by 1.) Similarly, if several VCs have the same source-destination pair, only the one with highest credit is considered, and the others will have $S_f(t)=0$.

Let $\{S_f^*(t)\}$ be another set of zero-one values that specify a maximum weighted matching at time t. Then theorem 1 states that $$\Sigma_f[C_f(t)S_f(t)] \geq \frac{1}{2}\Sigma_f[C_f(t)S_f^*(t)].$$

We have:

$$C_f(t+1) = C_f(t) + g_f - S_f(t) \tag{13}$$

$$V(t+1) - V(t) = \sum_f [C_f(t+1)^2 - C_f(t)^2] \tag{14}$$

$$= \sum_f [2C_f(t)(g_f - S_f(t)) + (g_f - S_f(t))^2] \tag{15}$$

$$\leq 2\sum_f [C_f(t)(g_f - S_f(t))] + K_1 \tag{16}$$

where the term $\Sigma_f(g_f - S_f(t))^2$ has been bounded by some constant $K_1$ in the last inequality. This is possible because both $g_f$ (given constants) and $S_f(t)$ (either 0 or 1) are bounded.

The set $\{S_f(t)\}$ specifies the chosen matching. The following lemma, now relates $g_f$ and $\alpha$ to matchings:

Lemma 1 (Convex Combination) Given that the $g_f$ values correspond to a certain reservation factor $\alpha$, there exist K sets of zero-one values $\{S_f^1\}, \{S_f^2\}, \ldots, \{S_f^K\}$ K such that:

1. Each set $\{S_f^k\}$ (k=1, ..., K) corresponds to an matching. In other words, within each set, at most one VC f with source u has $S_f^k=1$ (for any $u \in U$) and at most one VC with destination v has $S_f^k=1$ (for any $v \in V$).
2. The set $\{g_f\}$ can be written as a convex combination of these K sets with total weight at most $\alpha$, i.e., there are coefficients $\beta_1, \ldots, \beta_K$ such that $g_f = \Sigma_k \beta_k S_f^k$ for any f, and where each coefficient $\beta_k > 0$ and their $\beta^{sum} = \Sigma_k \beta_k \leq \alpha$.

Using this lemma we obtain:

$$\sum_f [C_f(t)(g_f - S_f(t))] \tag{17}$$

$$\leq \sum_f \left[ C_f(t)\left(g_f - \frac{1}{2}S_f^*(t)\right) \right] \tag{18}$$

$$= \sum_f \left[ C_f(t)\left(\sum_k [\beta_k S_f^k] - \frac{1}{2}S_f^*(t)\right) \right] \tag{19}$$

$$= \sum_f \left[ C_f(t)\left(\sum_k [\beta_k (S_f^k - S_f^*(t))] - \left(\frac{1}{2} - \beta^{sum}\right)S_f^*(t)\right) \right] \tag{20}$$

$$= \sum_f \beta_k \left[ \sum_k C_f(t)S_f^k - \sum_f C_f(t)S_f^*(t) \right] - \left(\frac{1}{2} - \beta^{sum}\right)\sum_f C_f(t)S_f^*(t) \tag{21}$$

Consider the last equation. In the $\Sigma_k$ summation, the term $\Sigma_f C_f(t)S_f^*(t)$ is the weight of a maximum weighted matching. It is larger than or equal to each $\Sigma_f C_f(t)S_f^k$ term, which is the weight of some fixed matching. This, together with the fact that each $\beta_k > 0$, implies all the $\Sigma_k$ terms are $\leq 0$. In the second term, denote $(\frac{1}{2} - \beta^{sum})$ by $\gamma$. Note that $\gamma > 0$ because $\frac{1}{2} < \alpha \leq \beta^{sum}$. We have:

$$\sum_f [C_f(t)(g_f - S_f(t))] \leq 0 - \gamma \sum_f C_f(t)S_f^*(t) \tag{22}$$

$$= -\gamma \times \text{weight of maximum weighted matching} \tag{23}$$

Substituting this back into equation (16), we have $$V(t+1) - V(t) \leq 2\sum_f [C_f(t)(g_f - S_f(t))] + K_1 \tag{24}$$

$$\leq K_1 - 2\gamma \times \text{weight of maximum weighted matching} \tag{25}$$

We can finally prove that $V(t) = \Sigma_f C_f(t)^2$ is bounded. The logic has two parts: First, since $V(t+1) - V(t) \leq K_1$, the $V(t)$ value car only increase by a finite amount each timeslot.

Second, the largest edge weight at time t is at least $\sqrt{V(t)/\text{number of VCs}}$, and a maximum weighted matching weighs at least as much as the largest edge weight. Therefore, for large enough V(t), the maximum weighted matching will weigh more than the constant $K_1/2\gamma$, so that $V(t+1)-V(t)<0$, i.e., V will decrease in the next timeslot. Thus the value of V can increase by at most $K_1$ each timeslot, until it becomes too large and must decrease. Therefore V(t) is bounded for ail time.[11] So, each $C_f(t)$ is also bounded for all time.

Specifically, if $V(t)>V_{critical}=$no. of VCs$\times(K_1/2\gamma)^2$, then V must decrease in the next timeslot. Therefore the bound is $V(t)\leq V_{critical}+K_1$ for all time.

If integral edge weights $\lfloor C_f(t) \rfloor$ are used, each edge weight has changed at most by 1 and so the weight of any matching (S, S*, $S^k$) has changed by at most N. Such a bounded change can be absorbed by replacing the 0 in equation (22) by a constant $K_2$, similar to $K_1$ of equation (16).

Theorem 4 (Bucket-credit-weighted algorithm supports 50% reservations for any traffic pattern)

If $\alpha<\frac{1}{2}$, and each VC f has a finite bucket size $B_f$, then the bucket-credit-weighted algorithm guarantees that there is a bound $C_{max}$ such that, for any arbitrary traffic arrival pattern, at any time t, for any VC f, the VC's credit $C_f(t)\leq C_{max}$. This result holds whether the edge weights are fractional credits or an integral approximation, i.e., $\lfloor C_f(t) \rfloor$.

Proof: We will briefly outline how the previous proof can be adapted. Define $G_f(t)$ to be a VC's credit increment at timeslot t, i.e., $G_f(t)=0$ (missed credit increment) if the VC is idle and its $C_f(t)>B_f$, otherwise $G_f(t)=g_f$ (normal credit increment). Then equation (13) becomes instead $$C_f(t+1)=C_f(t)+G_f(t)-S_f(t) \qquad (26)$$

and equations (14)–(16) still hold after replacing $g_f$ with $G_f(t)$.

Let $F_b(t)$ be the set of VCs that are busy (non-empty queues) at time t, and let $F_i(t)$ be the set of idle VCs. Since the algorithm ignores idle VCs, their $C_f(t)$ do not contribute to a matching's weight, i.e., they are not among the positive edge weights actually used by the CQ algorithm. The crucial observation is this: the weight of matching $\{S_f\}$ is given by $\Sigma_{f\in F_b(t)}C_f(t)S_f(t)$, where the summation only includes busy VCs, not idle VCs. Based on this observation, we can rewrite the left hand side of equation (18) as $$\sum_f [C_f(t)(G_f(t)-S_f(t))] \qquad (27)$$

$$=\sum_{f\in F_b(t)} [C_f(t)(G_f(t)-S_f(t))] + \sum_{f\in F_i(t)} [C_f(t)(G_f(t)-S_f(t))] \qquad (28)$$

$$=\sum_{f\in F_b(t)} [C_f(t)(G_f(t)-S_f(t))] + (K_2-0) \qquad (29)$$

where the term $\Sigma_{f\in F_i(t)}[C_f(t)S_f(t)] =0$ (no service possible, i.e., $S_f(t)=0$, for idle VCs), and the term $\Sigma_{f\in F_i(t)}[C_f(t)G_f(t)]$ has been bounded by some positive constant $K_2$, because idle VCs either have bounded $C_f(t)$ (bucket size restriction) or $G_f(t)=0$ (no credit increment). The remaining term $\Sigma_{f\in F_b(t)}[C_f(t)G_f(t)]$ can now be treated just like $\Sigma_f[C_f(t)g_f]$ of equations (18)–(23). In particular, at any time t, the set $\{G_f(t)\}_{f\in F_b(t)}$ can still be written as a convex combination of some matchings in the style of lemma 1 (since $G_f(t)\leq g_f$). Thus equations (23) and (25) simply become $$\sum_f [C_f(t)(G_f(t)-S_f(t))] \leq \qquad (30)$$

$$K_2 - \gamma \times \text{weight of maximum weighted matching}$$

$$V(t+1)-V(t)\leq(K_1+2K_2)-\gamma\times\text{weight of maximum weighted matching} \qquad (31)$$

and the rest of the proof follows without change.

We claim:

1. A method for scheduling transmission of cells through a data switch having a plurality of inputs and outputs, comprising the steps of:

providing, at each input, a plurality of buffers corresponding to the outputs, said buffers temporarily holding cells;

within each timeslot, assigning credits to each buffer according to a guaranteed bandwidth for that buffer;

assigning a weight to each buffer;

setting the weight associated with each buffer based on an accumulated number of credits associated with the buffer;

selecting buffers according to a weighted matching of inputs and outputs wherein each unselected buffer shares an input or an output with a selected buffer whose weight is greater or equal to the unselected buffer's weight;

transmitting cells from the selected buffers to the corresponding outputs.

2. The method of claim 1 wherein the matching is a maximal weighted matching.

3. The method of claim 1 wherein the steps of assigning weights, selecting buffers and transmitting cells are repeated for consecutive timeslots.

4. The method of claim 1 wherein credits are assigned in integral units including zero.

5. The method of claim 1 wherein the weight associated with a buffer is zero if the buffer is empty, regardless of actual credit.

6. The method of claim 1 wherein a credit bucket size is assigned to each buffer, such that if a buffer is empty and has a number of credits exceeding its associated credit bucket size, the buffer receives no further credits.

7. The method of claim 1 further comprising the step of setting each weight associated with a buffer to either the buffer's length, or to the number of credits associated with the buffer.

8. The method of claim 1 further comprising the step of setting each weight associated with a buffer to either the buffer's length, or to the number of credits associated with the buffer, whichever is less.

9. The method of claim 8 further comprising:

maintaining an age for each cell; and if the age for some cell exceeds a predefined threshold for the corresponding buffer, employing an exception mechanism to decide whether to select the buffer.

10. The method of claim 8 further comprising the step of flushing out cells during long idle periods.

11. The method of claim 1 further comprising the step of setting each weight associated with a buffer to a validated waiting time associated with an oldest cell in the buffer.

12. The method of claim 11 further comprising the steps of:
  validating a cell when there is a credit available;
  recording the time of validation for each cell; and
  calculating the validated waiting time for each cell based on the current time and the validation time.

13. The method of claim 11 wherein the validated waiting time of an oldest cell is calculated as a minimum of actual waiting time of the oldest cell and an age of an oldest credit associated with the buffer.

14. The method of claim 11 wherein the validated waiting time of an oldest cell is estimated, the estimation being based on actual waiting time of the oldest cell, a number of credits associated with the buffer, and the rate at which credits are accrued.

15. The method of claim 11 wherein each validated waiting time associated with a buffer is scaled by a constant which is inversely proportional to a predetermined tolerable delay.

16. The method of claim 15 wherein the predetermined tolerable delay is the inverse of the guaranteed bandwidth associated with the buffer.

17. The method of claim 1 wherein the data switch is a crossbar switch.

18. A method for scheduling transmission of cells through a data switch having a plurality of inputs and outputs, comprising the steps of:
  providing, at each input, a plurality of buffers corresponding to the outputs, said buffers temporarily holding cells;
  assigning a weight to each buffer;
  selecting buffers according to a weighted matching of inputs and outputs wherein each unselected buffer shares an input or an output with a selected buffer whose weight is greater or equal to the unselected buffer's weight; and
  transmitting cells from the selected buffers to the corresponding outputs;
  at each timeslot, computing a matching and a corresponding total edge weight;
  comparing a total edge weight of a current matching with an immediately preceding matching; and
  selecting the matching with a larger corresponding edge weight.

19. A method for scheduling transmission of cells through a data switch having a plurality of inputs and outputs, comprising the steps of:
  providing, at each input, a plurality of buffers corresponding to the outputs, said buffers temporarily holding cells;
  assigning a weight to each buffer;
  selecting buffers according to a weighted matching of inputs and outputs as determined by a stable marriage algorithm, wherein each unselected buffer shares an input or an output with a selected buffer whose weight is greater or equal to the unselected buffer's weight;
  transmitting cells from the selected buffers to the corresponding outputs;
  providing fairness in allocating leftover bandwidth by determining a second matching between remaining inputs and outputs;
  selecting buffers according to the second matching; and
  transmitting cells from the selected buffers to the corresponding outputs.

20. The method of claim 19, wherein max-min fairness is provided.

21. The method of claim 19, wherein, during a second phase of weight assignments, additional paths are chosen based on usage weights.

22. The method of claim 19, wherein allocating leftover bandwidth fairly comprises assigning weights based on usage and credits.

23. A method for scheduling transmission of cells through a data switch having a plurality of inputs and outputs, comprising the steps of:
  providing, at each input, a plurality of buffers corresponding to the outputs, said buffers temporarily holding cells;
  assigning a weight to each buffer;
  selecting buffers according to a weighted matching of inputs and outputs wherein each unselected buffer shares an input or an output with a selected buffer whose weight is greater or equal to the unselected buffer's weight;
  transmitting cells from the selected buffers to the corresponding outputs;
  providing, at each input, a buffer for each virtual connection, wherein several virtual connections share the same input-output pair, each virtual connection having its own guaranteed rate;
  for each input/output pair, determining which virtual connection within the input/output pair has a maximum weight;
  assigning the respective maximum weight to the corresponding input/output pair;
  selecting input/output pairs based on the assigned weights, and according to a maximal weighted matching; and
  transmitting cells from the selected inputs to the corresponding outputs.

24. A method for scheduling transmission of cells through a data switch having a plurality of inputs and outputs, comprising the steps of:
  providing, at each input, a plurality of buffers corresponding to the outputs, said buffers temporarily holding cells;
  assigning a weight to each buffer;
  selecting buffers according to a weighted matching of inputs and outputs wherein each unselected buffer shares an input or an output with a selected buffer whose weight is greater or equal to the unselected buffer's weight, the matching being a maximal weighted matching determined by using a stable marriage algorithm; and
  transmitting cells from the selected buffers to the corresponding outputs.

25. A method for scheduling transmission of cells through a data switch having a plurality of inputs and outputs, comprising the steps of:
  providing, at each input, a plurality of buffers corresponding to the outputs, said buffers temporarily holding cells;
  assigning a weight to each buffer;
  selecting buffers according to a weighted matching of inputs and outputs, as determined by a stable marriage algorithm each unselected buffer sharing an input or an output with a selected buffer whose weight is greater or equal to the unselected buffer's weight, and buffers having a greatest weight being selected first, followed by buffers having a next greatest weight, and so on, until buffers having a least positive weight are assigned; and transmitting cells from the selected buffers to the corresponding outputs.

26. A method for scheduling transmission of cells through a data switch having a plurality of inputs and outputs, comprising the steps of:

providing, at each input, a plurality of buffers corresponding to the outputs, said buffers temporarily holding cells;

assigning a weight to each buffer;

selecting buffers according to a weighted matching of inputs and outputs wherein each unselected buffer shares an input or an output with a selected buffer whose weight is greater or equal to the unselected buffer's weight;

providing a data structure of linked lists, each list being associated with a weight, each list holding references to buffers having said associated weight, and each list having links to next and previous lists associated respectively with weights one greater and one less than the subject list's associated weight;

placing each buffer reference in a list associated with the weight of the buffer;

upon incrementing a buffer's weight by one, moving its reference from its current list to the next list, and upon decrementing an buffer's weight by one, moving its reference from its current list to the previous list; and for each list, in order of descending associated weight, selecting buffers which do not share input or output nodes with buffers which have already been selected; and transmitting cells from the selected buffers to the corresponding outputs.

27. A method for scheduling transmission of cells through a data switch having a plurality of inputs and outputs, comprising the steps of:

providing, at each input, a plurality of buffers corresponding to the outputs, said buffers temporarily holding cells; and within each timeslot, assigning credits to each buffer according to a guaranteed bandwidth for that buffer, assigning a weight to each buffer as a function of credits, determining a matching of inputs and outputs based on the assigned buffer weights and selecting buffers according to the matching, and transmitting a cell from each of the selected buffers to their corresponding outputs and removing a credit from each of the selected buffers.

28. The method of claim 27 wherein assigning weight to each buffer further comprises setting the weight to an accumulated number of credits associated with the buffer.

29. The method of claim 28 wherein the weight associated with a buffer is zero if the buffer is empty, regardless of actual credit.

30. The method of claim 28 wherein a credit bucket size is assigned to each buffer, such that if a buffer is empty and has a number of credits exceeding its associated credit bucket size, the buffer receives no further credits.

31. The method of claim 28 further comprising the step of setting each weight associated with a buffer to either the buffer's length, or to the number of credits associated with the buffer, whichever is less.

32. The method of claim 31 further comprising:

maintaining an age for each cell; and if the age for some cell exceeds a predefined threshold for the corresponding buffer, employing an exception mechanism to decide whether to select the buffer.

33. The method of claim 31 further comprising the step of flushing out cells during long idle periods.

34. The method of claim 31 further comprising the steps of:

validating a cell when there is a credit available;

recording a validation time; and assigning a weight associated with a buffer equal to a validated waiting time associated with an oldest cell in the buffer.

35. The method of claim 28 wherein credits are assigned in integral units including zero.

36. The method of claim 27 wherein the matching is determined by using a stable marriage algorithm.

37. The method of claim 27 wherein buffers having a greatest weight are selected first, followed by buffers having a next greatest weight, and so on, until buffers having a least positive weight are assigned.

38. The method of claim 27, further comprising the steps of:

providing a data structure of linked lists, each list being associated with a weight, each list holding references to buffers having said associated weight, and each list having links to next and previous lists associated respectively with weights one greater and one less than the subject list's associated weight;

placing each buffer reference in a list associated with the weight of the buffer;

upon incrementing a buffer's weight by one, moving its reference from its current list to the next list, and upon decrementing an buffer's weight by one, moving its reference from its current list to the previous list; and for each list, in order of descending associated weight, selecting buffers which do not share input or output nodes with buffers which have already been selected.

39. A method for scheduling transmission of cells through a data switch having a plurality of inputs and outputs, comprising the steps of:

providing, at each input, a plurality of buffers corresponding to the outputs, said buffers temporarily holding cells;

assigning a weight to each buffer;

providing a data structure of linked lists, each list being associated with a weight, each list holding references to buffers having said associated weight, and each list having links to next and previous lists associated respectively with weights one greater and one less than the subject list's associated weight;

placing each buffer reference in a list associated with the weight of the buffer;

upon incrementing a buffer's weight by one, moving its reference from its current list to the next list, and upon decrementing an buffer's weight by one, moving its reference from its current list to the previous list;

for each list, in order of descending associated weight, selecting buffers which do not share input or output nodes with buffers which have already been selected; and transmitting cells from the selected buffers to the corresponding outputs.

40. A data switch, comprising:

a plurality of inputs and outputs;

at each input, a plurality of buffers corresponding to the outputs, said buffers temporarily holding cells, wherein a weight is assigned to each buffer, said buffers being selected according to a weighted matching of inputs and outputs as determined by a stable marriage algorithm, such that each unselected buffer shares an input or an output with a selected buffer whose weight is greater or equal to the unselected buffer's weight, within each of a plurality of timeslots, credits being assigned to each buffer according to a guaranteed bandwidth for that buffer such that the weight associated with each buffer is based on an accumulated number of credits associated with the buffer; and a switch fabric through which cells from the selected buffers are transmitted to the corresponding outputs.

41. The data switch of claim 40 wherein the weight associated with a buffer is zero if the buffer is empty, regardless of actual credit.

42. The data switch of claim 40 wherein a credit bucket size is assigned to each buffer, such that if a buffer is empty and has a number of credits exceeding its associated credit bucket size, the buffer receives no further credits.

43. The data switch of claim 40 wherein each weight associated with a buffer is set to either the buffer's length, or to the number of credits associated with the buffer.

44. The data switch of claim 40 wherein each weight associated with a buffer is set to either the buffer's length, or to the number of credits associated with the buffer, whichever is less.

45. The data switch of claim 40 wherein each weight associated with a buffer is set to a validated waiting time associated with an oldest cell in the buffer.

46. The data switch of claim 45 wherein the validated waiting time for each cell is based on current time and the cell's validation time, the cell's validation time being when the cell is validated by an available credit.

47. The data switch of claim 45 wherein the validated waiting time of an oldest cell is calculated as a minimum of actual waiting time of the oldest cell and an age of an oldest credit associated with the buffer.

48. The data switch of claim 45 wherein the validated waiting time of an oldest cell is estimated, the estimation being based on actual waiting time of the oldest cell, a number of credits associated with the buffer, and the rate at which credits are accrued.

49. The data switch of claim 45 wherein each weight associated with a buffer is scaled by the guaranteed bandwidth associated with the buffer.

50. A data switch, comprising:

a plurality of inputs and outputs;

at each input, a plurality of buffers corresponding to the outputs, said buffers temporarily holding cells, wherein a weight is assigned to each buffer, said buffers being selected according to a weighted matching of inputs and outputs as determined by a stable marriage algorithm, such that each unselected buffer shares an input or an output with a selected buffer whose weight is greater or equal to the unselected buffer's weight; and a switch fabric through which cells from the selected buffers are transmitted to the corresponding outputs, a second matching between remaining inputs and outputs being determined, buffers being selected according to the second matching and cells being transmitted from the selected buffers to the corresponding outputs.

51. The data switch of claim 50, wherein the second matching is determined according to a max-min fairness algorithm.

52. The data switch of claim 50, wherein the second matching is based on usage weights during a second phase of weight assignments.

53. The data switch of claim 50, wherein weights are based on usage and credits.

54. A data switch, comprising:

a plurality of inputs and outputs;

at each input, a plurality of buffers corresponding to the outputs, said buffers temporarily holding cells, wherein a weight is assigned to each buffer, said buffers being selected according to a weighted matching of inputs and outputs such that each unselected buffer shares an input or an output with a selected buffer whose weight is greater or equal to the unselected buffer's weight;

a switch fabric through which cells from the selected buffers are transmitted to the corresponding outputs; and wherein several virtual connections share the same input-output pair, each virtual connection having its own guaranteed rate, the data switch further comprising, at each input, a buffer for each virtual connection, such that for each input/output pair, a virtual connection within the input/output pair, having a maximum weight, is identified, the maximum weight corresponding to the identified virtual connection, is assigned to the respective input/output pair, input/output pairs are selected based on the assigned weights, and according to a maximal weighted matching, and cells are transmitted from the selected inputs to the corresponding outputs.

55. A data switch, comprising:

a plurality of inputs and outputs;

at each input, a plurality of buffers corresponding to the outputs, said buffers temporarily holding cells, such that within each of a plurality of timeslots, credits are assigned to each buffer according to a guaranteed bandwidth for that buffer, a weight is assigned to each buffer as a function of credits, a matching of inputs and outputs, based on the assigned buffer weights, is determined and buffers are selected according to the matching, and a cell is transmitted from each of the selected buffers to their corresponding outputs and a credit is removed from each of the selected buffers .

56. A data switch, comprising:

a plurality of inputs and outputs;

at each input, a plurality of buffers corresponding to the outputs, said buffers temporarily holding cells, wherein a weight is assigned to each buffer;

a data structure of linked lists, each list being associated with a weight, each list holding references to buffers having said associated weight, and each list having links to next and previous lists associated respectively with weights one greater and one less than the subject list's associated weight, wherein each buffer reference is placed in a list associated with the weight of the buffer, upon incrementing a buffer's weight by one, its reference is moved from its current list to the next list, and upon decrementing an buffer's weight by one, its reference is moved from its current list to the previous list, and for each list, in order of descending associated weight, buffers are selected which do not share input or output nodes with buffers which have already been selected.

57. A data switch, comprising:

a plurality of inputs and outputs;

at each input, a plurality of buffer means for temporarily holding cells, each buffer means corresponding to the outputs;

credit assigning means for assigning credits to each buffer means;

weight assigning means for assigning a weight to each buffer means as a function of credits;

matching means for determining a matching of inputs and outputs, based on the assigned weights, such that buffer means are selected according to the matching, and transmission means through which cells from the selected buffer means are transmitted to the corresponding outputs, wherein a credit is removed from each of the selected buffers.

58. A data switch, comprising:

a plurality of inputs and outputs;

at each input, a plurality of buffer means for temporarily holding cells, said buffer means corresponding to the outputs;

weight assigning means for assigning a weight to each buffer means;

list means, each list means being associated with a weight, for holding references to buffer means having said associated weight, and each list means having link means to next and previous list means associated respectively with weights one greater and one less than the subject list means' associated weight, wherein each buffer means reference is placed in a list means associated with the weight of the buffer means, upon incrementing a buffer means' weight by one, its reference is moved from its current list means to the next list means, and upon decrementing a buffer means' weight by one, its reference is moved from its current list means to the previous list means, and for each list means, in order of descending associated weight, buffer means are selected which do not share input or output nodes with buffer means which have already been selected.

\* \* \* \* \*

UNITED STATES PATENT AND TRADEMARK OFFICE
CERTIFICATE OF CORRECTION

PATENT NO.     : 6,359,861 B1
DATED          : March 19, 2002
INVENTOR(S)    : Kai-Yeung S. Siu and Anthony C. Kam It is certified that error appears in the above-identified patent and that said Letters Patent is hereby corrected as shown below:

<u>Title page,</u>
Item [75], Inventors, first named inventor should read -- Kai-Yeung S. Siu -- instead of "Kai-Yeung S. Sui".

Signed and Sealed this

Fourth Day of June, 2002

*Attest:*

*Attesting Officer*

JAMES E. ROGAN
*Director of the United States Patent and Trademark Office*